United States Patent [19]

Sheppard

[11] Patent Number: 5,433,777

[45] Date of Patent: Jul. 18, 1995

[54] AGGREGATES AND MATERIALS EMPLOYING SAME

[75] Inventor: Michael Q. Sheppard, Homer, Ak.

[73] Assignee: Ushers, Inc., Portland, Oreg.

[21] Appl. No.: 227,368

[22] Filed: Apr. 13, 1994

Related U.S. Application Data

[63] Continuation-in-part of Ser. No. 960,920, Oct. 13, 1992, abandoned and a continuation-in-part of PCT/US93/09793, filed Oct. 13, 1993.

[51] Int. Cl.$^6$ .............. C09D 7/12; C04B 14/00; C04B 16/12
[52] U.S. Cl. .................. 106/400; 106/401; 106/412; 106/902; 106/753; 428/357; 501/1
[58] Field of Search ............. 106/400, 401, 412, 902, 106/753; 428/357; 501/1

[56] References Cited

U.S. PATENT DOCUMENTS

| | | | |
|---|---|---|---|
| 3,613,166 | 10/1971 | Wallace . | |
| 3,846,085 | 11/1974 | Dunn, Jr. | 29/191.6 |
| 4,261,706 | 4/1981 | Blanding | 51/295 |
| 4,370,390 | 1/1983 | Burk | 428/357 |
| 4,400,421 | 8/1983 | Stover | 428/357 |
| 4,588,443 | 5/1986 | Bache | 106/97 |
| 4,605,443 | 8/1986 | MacDowell | 106/104 |
| 4,873,810 | 10/1989 | Lecaroz | 52/575 |
| 4,965,138 | 10/1990 | Gonzalez | 428/593 |
| 5,081,081 | 1/1992 | Fothergill | 501/105 |
| 5,091,765 | 2/1992 | Yoshinaka et al. | 357/30 |
| 5,110,652 | 5/1992 | Allaire et al. | 428/114 |
| 5,124,287 | 6/1992 | Wehrenberg | 501/106 |
| 5,154,561 | 10/1992 | Lee | 414/138 |
| 5,155,071 | 10/1992 | Jacobson | 501/103 |
| 5,169,566 | 12/1992 | Stucky et al. | 252/629 |
| 5,213,591 | 5/1993 | Celikkaya et al. | 51/293 |
| 5,346,422 | 9/1994 | Bagrudia et al. | 428/357 |

FOREIGN PATENT DOCUMENTS

| | | | |
|---|---|---|---|
| 0054005 | 6/1982 | European Pat. Off. . | |
| 0065410 | 11/1982 | European Pat. Off. . | |
| 0436220 | 7/1991 | European Pat. Off. . | |
| 955974 | 1/1950 | France . | |
| 1160066 | 7/1958 | France . | |
| 1488301 | 7/1967 | France . | |
| 2201266 | 4/1974 | France . | |
| 263698 | 1/1989 | German Dem. Rep. | 428/357 |
| 2900710 | 7/1980 | Germany . | |
| 56-072031 | 6/1981 | Japan . | |
| 4249137 | 9/1992 | Japan . | |
| 5117780 | 5/1993 | Japan . | |

OTHER PUBLICATIONS

Mandell et al., "Tensile Behaviour of Glass/Ceramic Composite Materials at Elevated Temperatures," *Journal of Engineering for Gas Turbines and Power*, vol. 109, (Jul. 1987) pp. 267–273.

Homeny et al., "Silicon Carbide Whisker/Alumina Matrix Composites: Effect of Whisker Surface Treatment on Fracture Toughness," *Journal of the American Ceramic Society*, vol. 73, No. 2, pp. 394–402. (Feb. 1990).

Karasek et al., "Characterization of Recent Silicon Carbide Whiskers," *Journal of Materials Science*, vol. 26, (1991), pp. 103–111.

Nutt, "Microstructure and Growth Model for Rice–Hull–Derived SiC Whiskers," *Journal of the American Ceramic Society*, vol. 71, No. 3, (Mar. 1988), pp. 149–156.

Karasek et al., "Characterization of Silicon Carbide Whiskers," *Journal of the American Ceramic Society*, vol. 72, No. 10, (Oct. 1989), pp. 1907–1913.

Karasek et al., "SiC Whisker Chracterization: An Update," *Ceramic Bulletin*, vol. 70, No. 2, (1991), pp. 224–228.

(List continued on next page.)

*Primary Examiner*—David Brunsman
*Attorney, Agent, or Firm*—Klarquist Sparkman Campbell Leigh & Whinston

[57] ABSTRACT

Aggregates, matrices, and composites exhibiting enhanced structural characteristics, together with methods and apparatuses for their manufacture, are disclosed. Many of these embodiments rely on three dimensional reticulation to enhance material property features, such as fracture toughness and resistance to thermal shock.

33 Claims, 13 Drawing Sheets

OTHER PUBLICATIONS

Petrovice et al., "Tensile Mechanical Properties of SiC Whiskers," *Journal of Materials Science*, vol. 20, (1985), pp. 1167–1177.

"Hollow Ceramic Spheres for Microengineered Properties," (author unknown), *American Ceramic Society Bulletin*, vol. 72, No. 1, (Jan. 1993) pp. 98–99.

Chou et al., "Composites," *Scientific American*, vol. 254, No. 10, (Oct. 1986), pp. 193–203.

Lee, "Microscopy of Refractory Bricks," Cer. Tech. Intl., (1993), pp. 1–5.

Shah et al., "Mechanical Behavior of Fiber-Reinforced Cement-Based Composites," *Journal of the American Ceramic Society*, vol. 74, No. 11, (Nov. 1991), pp. 2727–2953.

Tan et al., "Engineering Design of Tough Ceramic Matrix Composites for Turbine Components," *Journal of Engineering for Gas Turbines and Power*, vol. 113, (Apr. 1991), pp. 312–317.

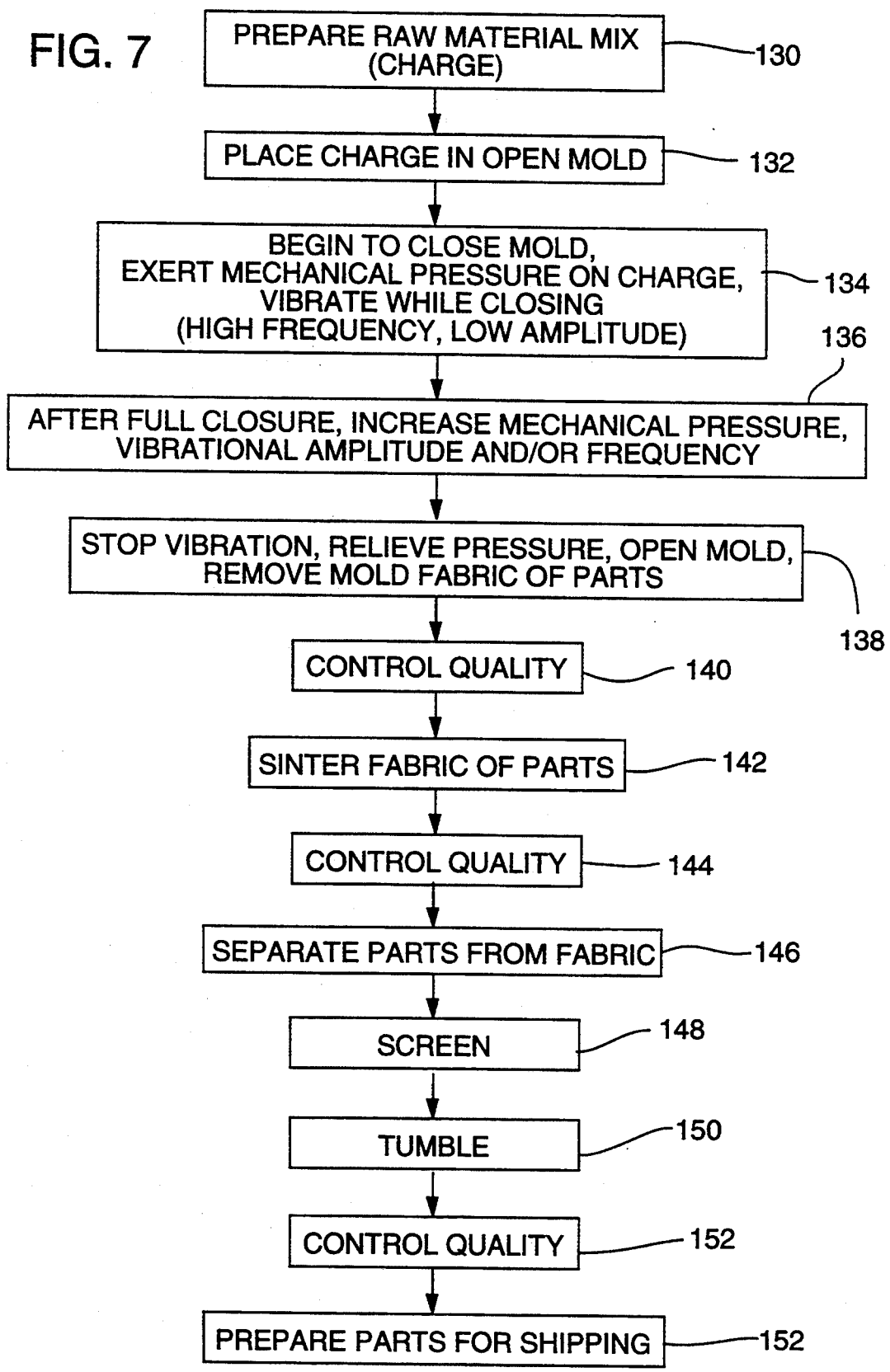

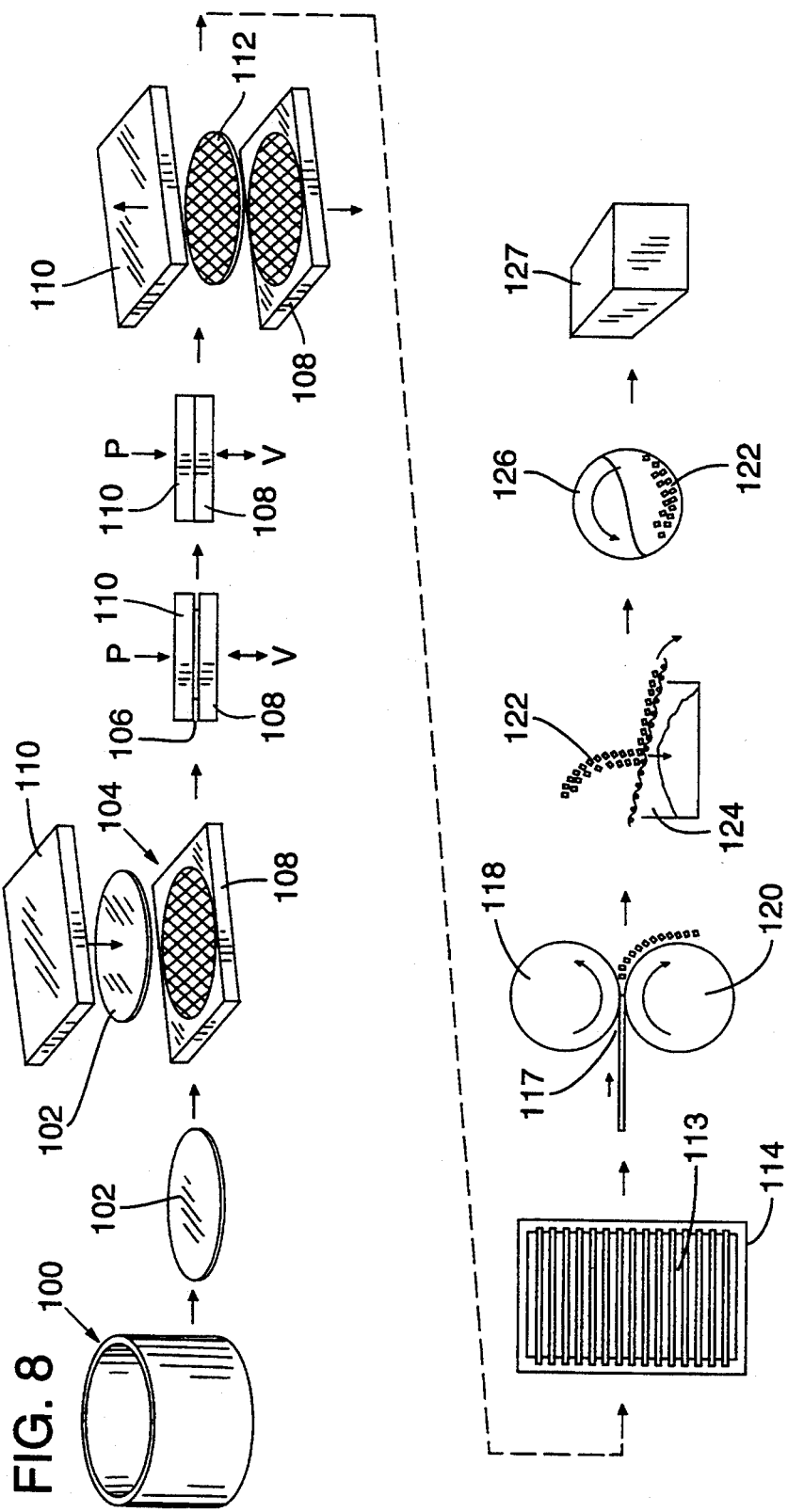

AGGREGATES AND MATERIALS EMPLOYING SAME

CROSS REFERENCE TO RELATED APPLICATIONS

This is a continuation-in-part of U.S. Ser. No. 07/960,920 filed Oct. 13, 1992 now abandoned. This is also a continuation-in-part of PCT application Ser. No. PCT/US93/09793 filed on Oct. 13, 1993, which is a continuation-in-part of U.S. Ser. No. 07/960,920 filed Oct. 13, 1992 now abandoned.

TECHNICAL FIELD

The present invention relates to aggregates, and methods and apparatuses for producing the aggregates and composites using same.

BACKGROUND AND SUMMARY OF THE INVENTION

The utility of many structural materials has been limited by, among other things, lack of strength, cracking and thermal expansion problems. Familiar examples are the fields of ceramic and clay materials, which have not generally been used for large scale structures due to lack of resistance to fracture under thermal stresses.

The failure mode of ceramics is often described as micro-structural deformations or micro-cracks partially caused by a non-homogeneous distribution of the particles and binders contained in the ceramic materials. It has been found that cracks propagate along a path in the two dimensional plane until the material fails.

The prior art has sought to ameliorate certain of these structural drawbacks by incorporating reinforcements selectively dispersed in a matrix. Platelets, fibers, whiskers, and minerals such as perlite and calcined grogs, are some of many such reinforcements that have been employed in ceramics materials. However, prior art reinforcements have been ill-suited for many large scale or otherwise demanding applications partly due to only marginal increase in fracture toughness. In particular, the tendency of many ceramic materials to exhibit catastrophic fatigue failure has severely limited the utility of ceramics in most structural and refractory applications. Also, the properties of ceramic materials have been difficult to predict due to imperfections created during green formation and sintering of the ceramics.

Currently known aggregates employed in high refractory bodies are spherical, tabular, or of random geometry. The primary engineering consideration is the packing efficiency. In general, a graded approach is practiced, wherein closed fractions of up to 5 different sizes are utilized to achieve near theoretical density. For example, Alcoa Corporation recommends the use of four different closed fractions of graded sizes in one of its commercial calcium aluminate cement products.

It is well known that smaller particles introduced and distributed in the interstices of packed larger particles reduce the porosity and pore size. The reverse is also true, where large particles added to finer particles displace fines and pores and reduce porosity. This model is called the Furnas model (C. C. Furnas, U.S. Bur. Mines Rep. Invst. 2894 (1928)). When the large particles in a packing are in contact, the theoretical maximum packing fraction $PF_{max}$ for a mixture of coarse, medium, and fine particles may be described as:

$$PF_{max} = PF_c + (1 - PF_c)PF_m + (1 - PF_c)(1 - PF_m)PF_f,$$

where $PF_c$, $PF_m$ and $PF_f$ are the packing factors of the coarse, medium, and fine particles, respectively.

For example, McGeary experimentally achieved a packing density of 95% for a quaternary system of vibrated steel spheres of diameters 1.28, 0.155, 0.028, and 0.004 cm. (R. K. McGeary, J. Am. Ceram. Soc. 44 (10), 513–522 (1961)).

Dinger and Funk, however, realized that for densest packing, continuous particle size distribution IS preferred. They derived the following relationship:

$$F_m(a) = \frac{a^n - a_{min}^n}{a_{max}^n - a_{min}^n},$$

where:
$F_m(a)$ = the cumulative fraction finer than particles size a;
n = the slope in cumulative particle size versus particle size distribution curve;
$a_{max}$ = the maximum particle size; and
$a_{min}$ is the minimum particle size.

The packing density may increase as 1/n and as the range of sizes increase, and the packing density may exceed 80%. It should be noted that the above considerations apply to particles which are spherical in shape and under ideal packing conditions. As well, it should be noted that under idealized spherical particle packing conditions, such as that achieved by McGeary (95%), the remaining 5% (the matrix space) is characterized by a pattern of discrete voids of fragile geometry connected by very thin passages between the coordination points of the spheres in this system.

For example, the prior art has used point-to-point contact of particles of spherical and near spherical shapes to achieve better densities. Additionally, one can also establish line contact for rod-shaped particles to improve packing. Packing is enhanced further by using platelets, because of the established surface-to-surface contact. However, in reality, when rod-like and platelet-like particles are used, bridging occurs, contributing to hindered packing. Even under ideal conditions where packing hindrance is not considered, a consequence of using rod-like and platelet-like particles is the loss of isometric properties. Loss of isometric properties can render the structure susceptible to failure arising from in-plane shear and tensile forces.

The isometric properties of a material using rod or platelet-shaped particles are usually lost because the particles have a tendency to orient themselves parallel to their long dimensions, thereby giving rise to layering and the consequent loss of these properties.

Although surface-to-surface contact yields the highest packing densities, it must be accomplished uniformly in all dimensions to retain both maximum packing density and isotropy. Uniform surface-to-surface contacts surrounding spherical particles is very difficult to achieve. Uniform line-to-line and surface-to-surface contact of rods and platelets is virtually impossible to achieve.

One reason for the cracking problems of many structural materials is that incomplete homogenization of the media being cast persists throughout the fabrication process. Subsequently, when materials bearing these inhomogeneities (material gradients) are placed into service, applied and/or inherent (fabrication related), stresses localize at the sites of the inhomogeneities to cause stress gradients. When the total crack surface area energy requirement for that locale has reached its critical threshold, crack propagation ensues.

As reported by Lawrence Nielsen in Mechanical Properties of Polymers and Composites, Marcel Dekker (1974), composite materials may be defined as materials made up of two or more components and consisting of two or more phases. Such materials must be divided into three general classes: 1. Particulate-filled materials consisting of a continuous matrix phase and a discontinuous filler phase made up of discrete particles; 2. Fiber filler composites; and 3. Skeletal or interpenetrating network composites consisting of two continuous phases. Examples of this last class of materials include filled open-cell foams and sintered mats or meshes filled with some material.

Many commercial polymeric materials are composites, although they are not often considered as such. Examples include polyblends and ABS materials, foams, filled polyvinyl chloride formulations used in such applications as floor tile and wire coatings, filled rubbers, thermosetting resins containing a great variety of fillers, and glass fiber-filled plastics. There are many reasons for using composite materials rather than the simpler homogeneous polymers. Some of these reasons are: 1. Increased stiffness, strength and dimensional stability; 2. Increased toughness or impact strength; 3. Increased heat distortion temperature; 4. Increased mechanical damping; 5. Reduced permeability to gases and liquids; 6. Modified electrical properties; and 7. Reduced cost.

Not all of the above desirable features are found in any single composite. The advantages that composite materials have to offer must be balanced against their undesirable properties, which include complex rheological behavior and difficult fabrication techniques, as well as a reduction in some physical and mechanical properties.

The properties of composite materials are determined by the properties of the components, by the shape of the filler phase, by the morphology of the system, and by the nature of the interface between the phases. Thus, a great variety of properties can be obtained with composites just by alteration of the morphological or interface properties. An important property of the interface which can greatly affect mechanical behavior is the strength of the adhesive bond between the phases.

Nevertheless, the fabrication of large structures currently remains out of the realm of possibility due to limitations in conventional ceramic processing technology in shape forming and consolidation of large bodies. The consolidation and sintering require uniform temperatures throughout the firing step which is exceedingly difficult and this leads to density variations due to temperature gradients. Microstructural nonuniformity thus results leading to thermal shock damage as the vessel is placed in use. As will be seen, we believe that our invention provides an improvement in the area of composite formulation and manufacture.

To advance the understanding of this invention, it is our belief that an abstract of certain novelties involved as applied to a specific and challenging application would be of help.

With the above definition in mind, consider a one-piece vessel for the long term (100,000+ years) storage of radioactive or otherwise hazardous waste.

Practically speaking, the vessel would have to be large and capable of holding one or more kiloliters of material. The state of the art in this field comprises short term solutions, at best, involving stainless steel, reinforced concrete, or polymeric composite vessels.

The goal is a vessel large enough to be practical, and engineered in such a way as to ensure its long term integrity. Specific material selection would follow exhaustive analysis. It is our belief that alumina, being plentiful, relatively inexpensive, non-absorptive, and highly resistant to damage from radiation is a likely candidate for such analysis.

It is believed that the vessel could be manufactured in the following fashion:

1. Finite element analysis would be employed to determine the exact size and dimensions of the vessel.

2. Once decisions concerning geometry and dimensions have been made, body-specific concerns, such as aggregate dimensions, matrix/aggregate and interphase constituent chemistry, and degree of reticulation, might be addressed. Here it is believed that, where a vessel wall thickness dimension of 10–20 cm is considered, an aggregate of approximately 0.10 to 1.00 cm (as measured by its longest dimension), would be appropriate. When the reticulation property of the manufactured aggregates is utilized in a composite, the interstice-space between the aggregates will form the matrix. The material contained in this space is herein referred to as 'matrix level reinforcement'. It should be realized that at high levels of aggregate reinforcement, i.e., greater than 75%, this matrix phase itself will be distinctly reticulate.

Matrix material candidates must exhibit high modulus of rupture, low thermal expansion coefficients and substantial resistance to thermal shock. Some candidates in this area of matrix material are alumina, mullite, the borosilicates, and lithium alumina silicate.

3. The aggregate can then be manufactured according to methods disclosed herein. Here it is believed that the principal reinforcement phase, when reticulated to achieve a 50 to 90 percent volume fraction (more or less), would leave a matrix phase of approximately 0.001 to 0.005 cm in thickness dimension. It is believed that this matrix phase (in the interest of achieving superior fracture resistance in the vessel) can itself be composed of a matrix and a reinforcement phase. Matrix level reinforcements would then be approximately 10 to 50 $\mu$m. Once nanophase production technology for these aggregates has been developed, this graded fraction approach to matrix reinforcement may be carried to at least another level.

4. Casting of the green structure could be carried out after methods already known to those skilled in the art. Considering the vessel's large size and demanding end use, however, alternative approaches to the known methodology might be considered. Uniformity in wall thickness and reticulation of reinforcement phase(s) is considered critically important. One method for achieving this uniformity might involve a bi-axial centrifugal casting approach wherein the mold, after having been charged with a controlled amount of matrix/aggregate, would then be rotated about two perpendicularly opposed axes. Mechanical, acoustic and/or ultrasonic energy would then be employed to facilitate an even wall thickness and reticulation of the reinforcement phase(s).

5. Waste loading, inspection, and/or monitoring ports (if not provided for in the mold design), may be accommodated at this point. Waiting until the casting has gone through a debindering and/or calcining phase before undertaking this effort may be advisable, however. Indeed, it may prove advisable to wait until after the vessel has been fully densified before machining the necessary fittings.

6. It is believed that full densification (sintering) of the structure might follow conventional furnacing methodology. However, given the vessel's extraordinary size, maintenance of uniform heat dispersion with conventional methodology might be difficult, if not impossible. An alternative to the known art might follow a novel directed laser, plasma, microwave sintering approach.

Pure alumina does not respond well to microwave radiation. Dopants, in the form of parts-per-million concentrations of certain metallic elements, have been used to accomplish a coupling effect. It is believed that where borosilicate and lithium alumina silicate matrix constituents are considered, this coupling might be achieved. It must be remembered that the reinforcement phase(s) (as disclosed herein) have already been sintered as part of the aggregate production process, and need only be interphased with (sintered to) the matrix constituents to achieve full densification of the vessel.

Therefore, a task of this magnitude requires a reinforcement which improves, among other things, the fracture resistance of structural materials, such as ceramic materials, and methods for making the same. As well, the unique shapes of these system components (in the present case reinforcements), will require advanced methods of consolidation of these components into composite systems.

One aspect of the present invention are aggregates having unique three-dimensional shapes which are theoretically capable of packing to near 100% density without any void volume and using only one size fraction. This high level of packing efficiency is the result of surface-to-surface contact of the novel shapes in a three-dimensionally reticulate matrix. The reinforcements disclosed herein exhibit uniqueness of shape which lead to the ability to reticulate in all dimensions; therefore, previous considerations of packing spherical particles in various configurations are not generally applicable. The surface-to-surface contact or plane-based coordination obtainable with these novel forms will result in an interactive and mutually supportive relationship between the discrete components thereby improving upon the point-to-point and line-to-line based coordination of conventional reinforcement geometries.

In accordance with another aspect of this invention, individual aggregates of predetermined composition, size, density, and/or porosity may be employed in fluid bed systems where architectural soundness of component geometry and exposed surface area of component geometry are prime considerations. Example applications in this field include, but are not limited to, fluid bed components in coal combustion systems as well as components in engineering systems that use catalysts.

In accordance with another aspect of the present invention, a structural matrix is formed using aggregates of a consistent, predetermined, reticulate form. One example of such an aggregate is designated a Tetrajack, which may be described as a base tetrahedron (the base) with coincident tetrahedra joining its four faces. Another example of such an aggregate is the Tetratwin. The Tetratwin may be described as a class of shapes based upon a pair of twin tetrahedra joined coincidentally on a single face. Still another reticulate form the Starjack, has the shape of six obelisks extending from the six faces of a base cube.

In accordance with another aspect of the present invention, a reticulate fatigue resistant matrix material is formed exhibiting only minimal crack propagation thereby avoiding catastrophic brittle failure.

In accordance with yet another aspect of this invention, a reticulate matrix is formed using precursor aggregate of the claimed shapes. The precursor aggregate are then ignited (ashed), dissolved or otherwise removed, leaving voids now defined by the geometry of the reticulated precursors. Such a body would find application (for example), in the refractory field as thermal insulation where dimensional stability, controlled porosity, and resistance to thermal shock are prerequisites. Such reticulated matrix structures with controlled void size, shape, and distribution can also be used as filters and chemical reaction beds.

In accordance with another aspect of this invention, precursor aggregate may be reticulated to a predetermined dispersion, then replaced or transformed in a variety of ways (chemical vapor deposition, etc.) to yield a composite body heretofore unobtainable.

In accordance with yet another aspect of this invention, extruded forms reinforced with aggregates of geometries herein disclosed may be formed. It is believed that an aggregate of three-dimensionally reticulate geometry (herein disclosed as the Tetratwin), which has a long axis approximately twice the length of its width, may be of particular advantage here. In fact, the nature of the extrusion process lends itself admirably to the reticulation or alignment of the reinforcements with or without the application of additional energy at or near the point of extrusion.

In accordance with still another aspect of the invention, a matrix employing reticulated aggregate forms is cast and sintered to serve as a containment vessel, such as may be suitable for the long term containment of toxic or nuclear waste.

In accordance with another aspect of the invention, the above containment vessel may be constructed in the form of a reticulate aggregate and disposed in a containment storage field in a reticulate fashion, thereby optimizing the storage capacity of the overall field and protecting it from catastrophic, seismic activity-related damage. The engineered degree of reticulation (dispersion) would follow substantial site review and finite element analysis of the proposed containment geometry. The distance of dispersion (degree of reticulation/matrix space) would then be filled with a filler, such as ordinary sand, to cushion and further stabilize the reticulated containment forms.

The resulting vessel (example compositions might be alumina/alumina, mullite/alumina, borosilicate glass-/alumina) is also highly resistant to thermal shock i.e., the structure's thermal coefficient of expansion does not jeopardize the vessel's integrity, even over wide temperature ranges. High thermal shock resistance is desirable when the vessel is subjected to rapid changes in temperature such as hot or cold radioactive waste materials. Also, the vessel's integrity is not jeopardized by uneven heat loading, such as might be experienced if "hot" elements were to precipitate and distribute themselves unevenly in the vessel.

In accordance with yet another aspect of the invention, a mold surface permitting the aggregate to be manufactured in sheet-like or "fabric" form wherein individual aggregate are joined each to the other by consistent "flash" elements is disclosed.

In yet another aspect of this invention, additional vibrational energy (from mechanical, ultrasonic, microwave or other sources in coherent or broadfield forms) is applied through the mold surfaces to the material being cast or press formed. This amalgam of potential vibrational candidates may be used singly or in combinations thereof. A continuous production process wherein green aggregates are press formed and then passed directly into a microwave sintering environment is envisioned.

In yet another aspect of this invention, a body may be composed of aggregate disposed in a reticulate matrix where the matrix itself is composed of aggregate of reticulate geometry. It is believed theoretically possible to employ reticulate aggregate geometry in a succession of aggregate to matrix closed fractions from less than several nanometers to more than several inches.

In yet another aspect of this invention, aggregates may be formed from mold surfaces employing a variety of conventional fabrication systems such as: hot isostatic pressing, cold isostatic pressing, injection molding, slip casting, drain casting, centrifugal casting, and gel casting. It is believed that a body resulting from the above approach to composition will represent a step forward in material strength and fracture toughness.

The foregoing and additional features and advantages of the present invention will be more readily apparent from the following detailed description, which proceeds with reference to the accompanying drawings.

BRIEF DESCRIPTION OF THE DRAWINGS

FIG. 7 shows a flow chart illustrating one manner of making the aggregates.

FIG. 8 shows a schematic illustration of one manner of making the aggregates.

DETAILED DESCRIPTION

The present invention is directed, inter alia, to the design, manufacture, and use of aggregates of novel shapes either by themselves or in pluralities as architecturally sound objects or as reinforcement candidates in composites.

The present invention is directed to unique aggregates as reinforcements for composite materials. It is believed that, when these new classes of aggregates are dispersed more or less uniformly in a matrix (reticulated), the resulting composition will exhibit strength and fracture resistance characteristics that are superior to conventional composite materials. Equally important to certain aspects of this invention is the capacity to produce large volumes of uniformly-sized aggregate with superior homogeneity of composition by press forming them with the aid of additional energy (i.e., ultrasound).

Figure 1:
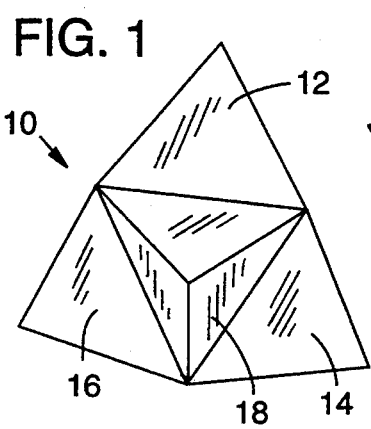
FIG. 1 shows an aggregate form according to a first embodiment of the invention.

Referring to FIG. 1, an aggregate or Tetrajack 10 according to one embodiment of the present invention has the shape of a equilateral tetrahedron (the "base" tetrahedron) to which four additional tetrahedra 12, 14, 16, 18 have been bonded, one on each of the four faces of the base tetrahedron. In practice, such an aggregate is desirably formed as an integral structure, the foregoing reference to bonding being an expository expedient.

Figure 2:
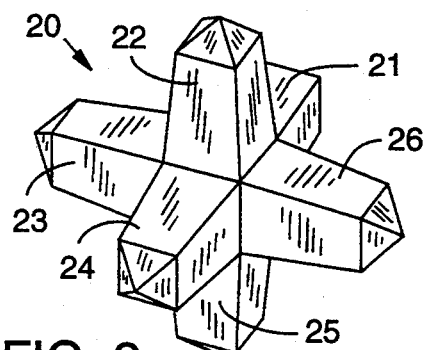
FIG. 2 shows an aggregate form according to a second embodiment of the invention.

FIG. 2 shows an alternative aggregate or a Starjack 20. This shape is characterized by a base cube, from which six four-sided arms 21, 22, 23, 24, 25, 26 extend. The arms may each have the shape of an obelisk.

FIGS. 3A–F show various views of yet another alternative aggregate or Tetratwin 30 which may consist of a class of shapes based upon a pair of twin tetrahedra wherein one of the twin tetrahedra is joined face-to-face by another twin tetrahedra of identical proportions and dimensions. In other words, the Tetratwin 30 is characterized by four four-sided pyramids wherein each pyramid has at least one side coinciding with another pyramid. More particularly, each pyramid has a base plane and three side planes. A first pair of pyramids is joined together by bonding the base plane of a first upper pyramid to the base plane of a first lower pyramid. Similarly, a second pair of pyramids is joined together by bonding the base plane of a second upper pyramid to the base plane of a second lower pyramid. One side plane of the first lower pyramids is bonded to one side plane of the second upper pyramid to form Tetratwin 30. Similar to the Tetrajack 10, the Tetratwin 30 preferably is constructed as an integral component without relying on bonding parts thereof together. Tetratwin 30 includes ten sides each labeled from 1-10. Due to the difficulty of illustrating this embodiment on a two-dimensional sheet, top, front, bottom, back and side views of the Tetratwin are shown.

Figure 4:
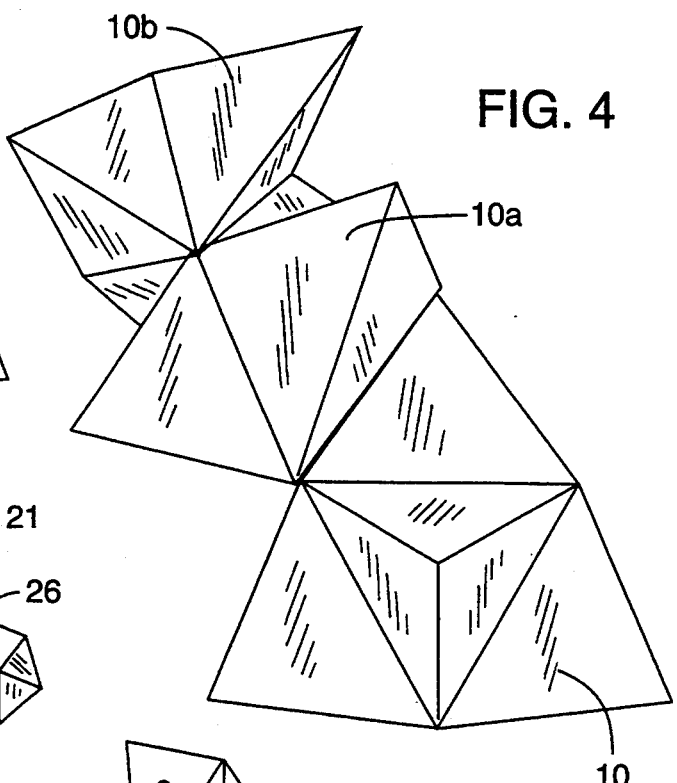
FIG. 4 shows an array of the aggregates of FIG. 1, illustrating one manner of their reticulation.
Figure 3B:
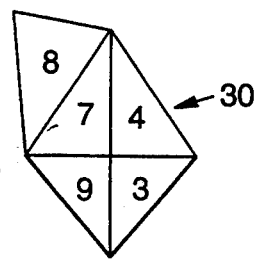
FIGS. 3A-3F show views of an aggregate form according to a third embodiment of the invention.
Figure 3C:
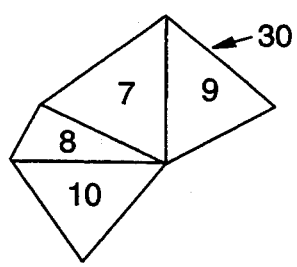
Figure 3A:
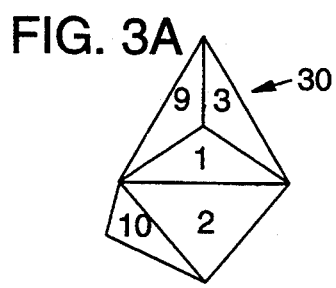
Figure 3D:
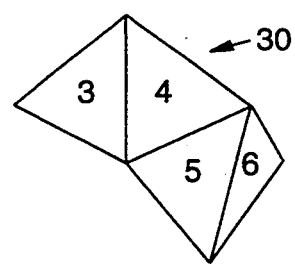
Figure 3E:
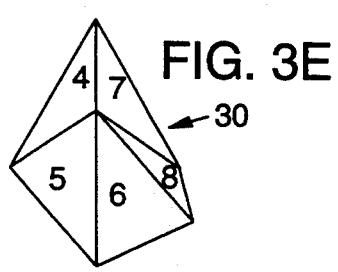
Figure 3F:
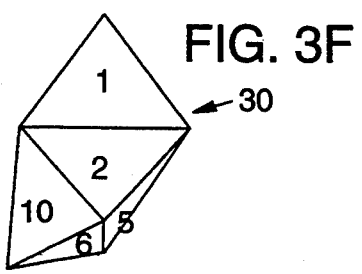
Figure 5:
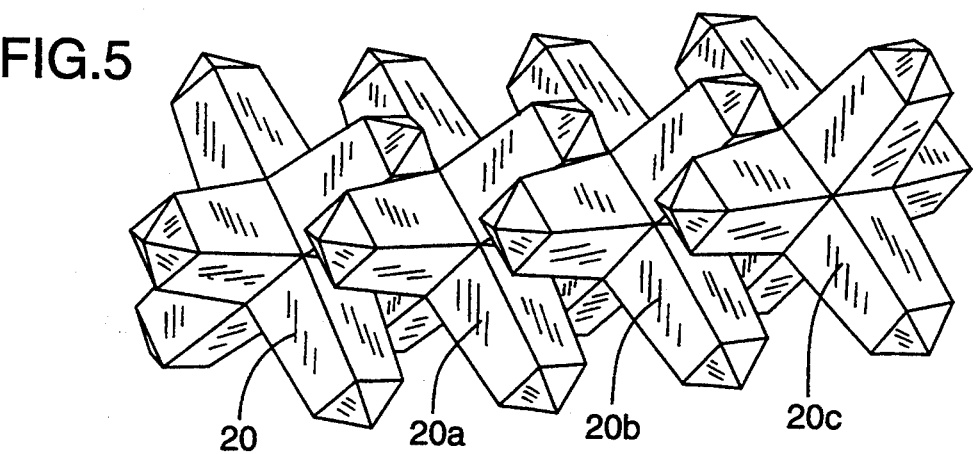
FIG. 5 shows an array of the aggregates of FIG. 2, illustrating one manner of their reticulation.
Figure 6:
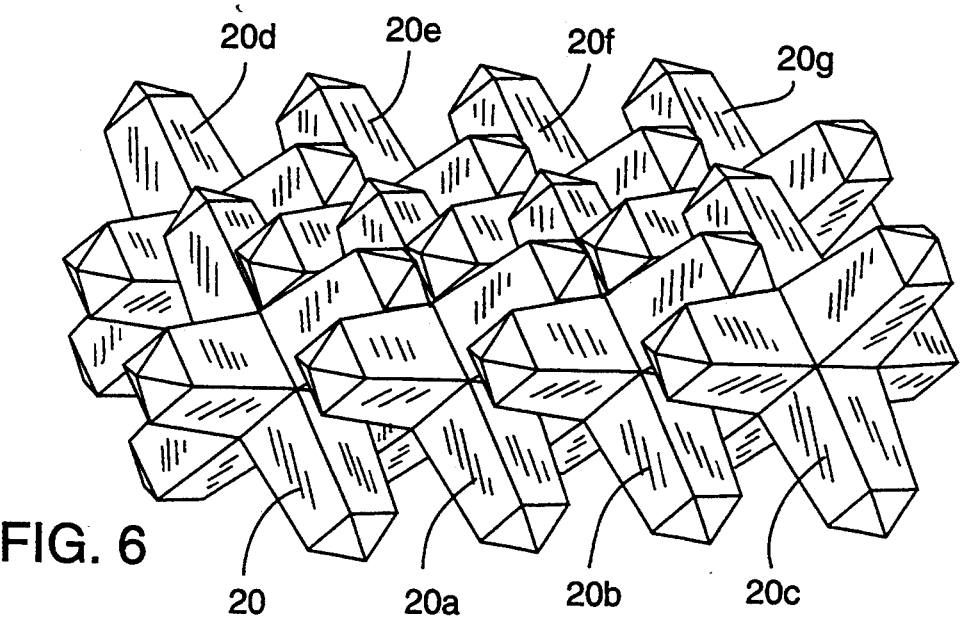
FIG. 6 shows a two-dimensional array of the aggregates of FIG. 2.

FIG. 4 shows Tetrajack 10 nested with other Tetrajacks 10a, 10b. Similarly, FIGS. 5 and 6 illustrate Starjack 20 nested with Starjacks 20a, 20b, and 20c in an array and in two dimensions further including Starjacks 20d, 20e, 20f and 20g.

The aggregates can be made of a variety of materials including but not limited to clays, ceramics, polymers, glass, and metal, metallic solid solutions, intermetallic compounds, glass-ceramics, carbon and graphites, mica, organic resin compounds, cements, cementitous materials, and composites thereof. The illustrated embodiments of the aggregates are made of alumina ceramics and organic polymers.

Clays are generally characterized by a predominance of hydrated silicates of aluminum, iron, or magnesium (both crystalline and amorphous), but may include many other components. The selection of a particular clay for a given application can be accomplished by one of ordinary skill in the art without undue experimentation. For further reading on the suitability of different clays for different applications, the reader is referred to the classic reference work Grim, R. E., *Clay Mineralogy*, 2d Edition, McGraw Hill International Earth & Planetary Science Series, New York 1968, ISBN: 0-317-28217-4, which is presently in print.

Although these aggregates can be more economically manufactured by the processes mentioned herein, it is conceivable that these shapes can be machined into shape individually by using currently known machining technology. Prior art has included reinforcing ceramic and cement-based refractories with steel wires and needles. However, improvements in loading efficiency and consequent improvements in material properties and performance can be realized by using such metallic materials in the Tetrajack, Starjack, and Tetratwin aggregate shapes which have three-dimensional reticulation inherent to their nature.

Other material candidates for hard, tough, and high temperature resistant aggregate include but are not limited to, oxides, such as aluminum oxide, zirconium oxide, magnesium oxide, chromium oxide, zinc oxide, ferrites, spinels and others. Many of the metal alkoxide sol-gel and solution precipitation and co-precipitation methods can be used, which would involve having a nucleating seed crystal of the specific shape described herein.

Carbides of tungsten, silicon, aluminum, boron, titanium, vanadium, hafnium, niobium, tantalum, chromium, molybdenum, and zirconium are all excellent candidates for the manufacture of aggregates depending upon the application and end-use. Many of these are oxidation resistant at elevated temperatures while others are not.

Borides of aluminum, titanium, zirconium, hafnium, vanadium, niobium, chromium, molybdenum are other choice candidates for the manufacture of aggregates can be used depending upon the application and end-use. Many of these materials offer excellent oxidation resistance at elevated temperatures while some of them do not.

Additionally, silicides of titanium, zirconium, hafnium, vanadium, niobium, tantalum, chromium, molybdenum, and tungsten are also eminently suitable as aggregates depending upon the application and end-use. Many of these materials provide excellent resistance to oxidation at elevated temperatures while some of them do not.

A wide variety of matrices can be used together with the aggregate, including, but not limited to, metals, metallic solid solutions, intermetallic compounds, ceramics, glasses, carbon and graphites, mica, plastics and other organic resin compounds, cements, cementitious materials, and composites thereof.

In the field of high-temperature thermoplastic matrix choices, it is believed that benefits can be obtained by employing the principles of our inventions. Possibilities include, but are not limited to: liquid crystal polymers (LCPs) with high chemical, radiation, weathering, and burn resistance, as well as heat deflection properties; polyamide-imide (PAI), resistant to solvents with good wear and friction resistance; polyarylate, which is tough, flame retardant, and resistant to ultraviolet light as well as dimensionally stable; polybenzimidazole with good compression strength and dimensional stability; polyetherimide (PEI) with chemical and creep resistance; polyethersulfone (PES) with good hydrolytic stability, chemical resistance, and heat deflection properties; polyimide (PI), excellent toughness, heat deflection, and chemical properties; polyketones, chemically resistant, strong and stiff; polyphenylene ether (PPE); polyphenelyne sulphide (PPS); polyphenylsulfone; polyphthalimide (PPA); polysulfone (PS); polyetherketone (PEK); polyetheretherketone (PEEK); polyetheretherketoneketone (PEEKK).

Preferably, all of the foregoing shapes have reticulate properties, i.e., the ability to form a network of cooperating like elements. As shown by FIGS. 4-6, this property permits the aggregates to be arranged in a nesting configuration, wherein faces of one aggregate are disposed adjacent faces of neighboring aggregates in a regular array. Three-dimensional arrays can also be constructed, but are more difficult to clearly illustrate.

In the case of the Tetrajack and Tetratwin, isotropy is maintained throughout the reticulation regime.

In the case of the Starjack, in particular, ordered arrays of the Starjack, isotropy is lost and a layering phenomenon occurs that is remarkably similar to the inter-lattice level bonding characteristics of classic atomic structure.

It is presently believed that this phenomenon can be advantageous in application fields such as superconductivity and data storage.

As discussed in detail below, in most, but not all cases, it is desirable that the aggregates not be packed into a "zero matrix," i.e., one wherein there are no gaps between the aggregates. One manner in which this can be achieved is in the design of the aggregate shape. For example, the six arms in the FIG. 2 aggregate are tapered, producing obelisk shapes. This taper prevents the arrangement of these aggregates into a zero matrix. (Indeed, the tapered shape permits this aggregate to be arrayed in a curved chain whose reticulation permits degrees of freedom reflected as arbitrary flexibility.)

One aspect of the present invention with respect to the reinforcement is the three dimensional reticulation. In other words, the aggregate can be stacked in a repeatable array in precise fashion in three dimensions.

Reticulation in a matrix/aggregate system often manifests itself as a web-like, network interface resulting from the more or less uniform nesting of the aggregate (reinforcement) components.

True, three-dimensional reticulation is often characterized by a particle to particle interface that is substantially parallel to the coordination planes of the discrete elements.

We believe the Starjack, Tetratwin and Tetrajack represent novel classes of aggregate shapes with reticulate geometries marked by, for example:

(1) The ability of same-class components of equivalent volume to nest uniformly;
(2) Improved architectural properties of the nesting pattern itself (reticulate matrix), which may be varied in its thickness dimension in accordance with application demands;
(3) Plane-based coordination opportunities for aggregate that are an improvement on the point-to-point-based coordination of spherical and random shapes or the line-to-line-based coordination of fibrous reinforcements;
(4) Substantially increased potential for crack path tortuosity; and
(5) The theoretical possibility that in the case of the Tetrajack and the Tetratwin, a zero matrix "composite" body may be achieved.

In order to achieve maximum benefit of the aggregate reticulation, the aggregate should be packed densely enough that they nest somewhat with each other, at least on a localized basis. Many of the structural advantages associated with reticulation increase with packing density. However, if the aggregate is of a shape that is susceptible to zero matrix packing, and the system is not designed for zero matrix, care must be taken that at least some matrix remains between adjacent aggregate pieces, else the structure may be susceptible to a large scale bonding failure. In just one illustrative embodiment, the aggregate comprises about 80 percent, by volume, of the composition. As is apparent, the aggregate may comprise more or less than 70-90 percent of the composition volume.

In some cases, structural and/or other benefits may be obtained by employing controlled volume fractions of the claimed reinforcements well below the high loading fractions called for in conventional systems. An example of such benefit might include aggregate of the claimed reticulate geometry intended for use in catalysis (chemical comminution, conversion, or filter support) where the advanced porosity (i.e., the available surface area for chemical reaction) and structural integrity of individual components are of substantial concern. In other words, the individual system components in such an environment must be architecturally sound as well as porous to achieve maximum benefit. These individual components of reticulate geometry may themselves be composed of controlled volume fractions of reinforcements of reticulate geometry. It is possible, for example, to fabricate system components of reticulate geometry such as that claimed herein using much smaller aggregate of reticulate geometry—a controlled percentage of which are designed to be ashed, dissolved or otherwise removed to obtain the desired porosity. In such systems porosity greater than 50% may be obtained while maintaining the structural integrity requirement of components.

To reduce the incidence of stress risers and further enhance the architectural properties of the disclosed aggregate, in some circumstances it can prove advisable to radius the edges of the aggregate appendages and fillet the corners where those appendages meet the base planes of said aggregate. These techniques are well known to those skilled in the art. Once again, the appropriate degrees of radius and fillet are application dependent.

It is believed that the packing density achievable using the above two different aggregate types are better than heretofore practiced art. We expect that near 100% packing densities may be obtained should the application demand it.

One threshold of packing density for the Starjack may occur when the Starjack is spaced closely enough that an imaginary plane cannot be positioned between two adjacent aggregates without intersecting each of said aggregates at more than a single point. Reticulation, in the case of the Tetrajack and Tetratwin, may be said to begin when:

1. An imaginary plane constructed between any two edges of any two appendages of a single Tetrajack or Tetratwin is penetrated by any aspect or appendage of another like element; and
2. An imaginary line constructed between any two points of any two appendages of a single Tetrajack or Tetratwin is broken or intersected by any aspect or appendage of another like element.

As an example of conventional packing of regular monospheres within specific geometrical arrangement or configurations, the following table applies:

| Configuration | Coordination Number | Packing Density (%) |
| --- | --- | --- |
| Cubic | 6 | 52.4 |
| Orthorhombic | 8 | 60.5 |
| Tetragonal | 10 | 69.8 |
| Tetrahedral | 12 | 74.0 |
| Pyramidal | 12 | 74.0 |

In determining the shape of the best aggregate, several considerations apply. One critical aspect relates to the available surface area per unit volume of the aggregate. A large surface area-to-volume ratio is often desirable for high packing efficiency and effective reinforcement properties of the aggregates when used to reinforce matrix composite materials. It is believed that, when compared to conventional reinforcements such as spheres, random particles, platelets and whiskers, fewer aggregates of the present invention will be required to achieve an equivalent volume fraction of reinforcement. In other words, the aggregates of the present invention are more efficient in terms of the space they can occupy than the above conventional reinforcement (aggregate) shapes.

Another consideration for usefulness of an aggregate is its architectural soundness. For example, even though objects such as flakes and irregular particles may have very high surface area-to-volume ratio, they are not architecturally sound objects. i.e., they have reduced capacity to support load. The aggregates of the present invention, on the other hand, exhibit superior architectural soundness in addition to their high surface-to-volume ratios and reticulate properties.

The nature of the aggregate reinforcement and its available surface area to its volume is, in many applications, believed to be an important factor. This surface area is then available for inter-phase reactions whether they are chemical, mechanical, or both. The larger the area of this surface reinforcement in components of architecturally sound, reticulate geometry, the larger the benefits of the reinforcement.

Indeed, it has been the industry practice to load as high a fraction of reinforcement as possible. Consequently, the attainable volume fraction of reinforcement is limited only by geometric packing considerations of the aggregates and related composite fabrication issues. It is believed that, taken as a whole, our invention addresses both of these areas of concern. We believe that the shape of the aggregates strongly suggests vibration as a facilitative mode to encourage their full reticulation. As such, it is believed that the novelties herein disclosed, though various in their nature, represent but appendages to a single work of art.

In the past, combinations of short fibers and spheres have been analyzed from the principles of micropacking. (See for instance: J. V. Milewski, "The Combined Backing of Rods and Spheres in Reinforcing Plastics", Ind. Eng. Prod. Res. Dev., Vol 17 No 4, P363 (1978)). The critical variables include the size diameter ratio of the fiber to the sphere and how this ratio changes with the fiber L/D (length to diameter) ratio.

In some applications, short whiskers are preferred since too high an aspect ratio (too long) results in balling and clumping that offer problems in efficient packing. It is known that for aspect ratios between 25 and 40, the texture of the fibers changes, and bundling and clumping develop. The effect is readily apparent when the aspect ratio is 75. This hindered packing results in higher void volume. Similarly, loading levels of short fibers greater than 60% volume fraction result in greater difficulty in manufacturing.

With the special aggregate shapes which are described herein, it is possible to obtain extremely high reinforcement loading without packing hindrance. As mentioned above, it is theoretically possible to have "zero matrix," wherein the entire body consists only of these packed aggregates, with zero void volume. This high degree of variability in dispersion (reticulation from greater than 100% to less than 100% $V_f$) with such an embodiment presents the user with improved high strength and highly fracture resistant engineering structures, mechanical devices, catalytic system components, automotive components, refractory and construction materials, nuclear, chemical and other waste management containment structures. Because of the novel and heretofore unobtainable microstructural and reinforcement architecture, high strength and flexure resistant thin structures are now possible, resulting in savings of weight, which is a significant consideration for many applications such as automotive and aerospace applications.

For example, the following schematic illustrates the relative surface area per unit volume for different geometric shapes such as the Tetrajack, Starjack, Tetratwin, a cube, and a sphere. To make a comparison between the various shapes uniform, the Tetrajack has a base length of 0.125 unit length; the cube has a side of 0.125 unit length; the sphere has a diameter of 0.125 unit length; and the Starjack, whose proportions illustratively follow those portrayed in FIG. 2, has a base cube side length of 1.00. As will be seen, the surface area-to-volume of the Tetrajack is considerably higher than the other reinforcement shapes.

The following table casts the information presented above in a different way which is more useful, since direct comparisons can be made with well-researched spherical aggregates. The percentage gain in surface area for an equivalent volume is superior in the case of the novel aggregates presented here. For example, the Tetrajack gives 77.39% more surface area for both reinforcement as well as fracture crack propagation aspects than the equivalent volume fraction of the sphere; the Starjack 39.75% more and the Tetratwin 33.05% more than equivalent spheres.

TABLE

Equivalent surface-to-volume for various aggregate shapes

| Aggregate Shape | Surface to Volume Ratio to Sphere |
|---|---|
| Tetrajack | 1.77394 |
| Starjack | 1.39746 |
| Tetratwin | 1.33046 |
| Cube | 1.24070 |
| Sphere | 1.00000 |

The size and proportions of the aggregate pieces are highly application dependent. It is thought that for a containment vessel with a wall thickness of about ten centimeters, aggregates having maximum dimensions on the order of 0.10 to 2.5 centimeters may be suitable. Of course, larger or smaller aggregates can be used, according to application dependent considerations. Thus, aggregates according to the present invention can have a wide range of maximum dimensions, such as approximately 50 nanometers to 20 centimeters or more.

In the case of a refractory concrete application where the industry standard size ranges from approximately 5 millimeters to 600 microns, an exemplary aggregate of the novel geometry such as is described in this invention (the Tetrajack for instance) might be 3 millimeters (as measured by its longest dimension).

In special case applications, very large aggregate (up to several meters as measured by their longest dimension) may be constructed. One such example of a very large aggregate might be a hazardous waste containment vessel (itself constructed of aggregate-reinforced material). The vessel's interactive and reticulate geometry would lend itself to dense packing within a storage field. A calculated void space (matrix) could then be filled with a medium such as sand. It is believed that the resulting array would optimize the storage opportunity in the containment field as well as exhibit superior resistance to cataclysmic seismic activity.

In concrete and advanced refractory applications, the sizes of the aggregates may range from 2 to 5 mm. When used as a reinforcement for metal-matrix composites, the aggregate size can vary between 50 and 1000 micrometers. Polymer-matrix composites can utilize these special ceramic reinforcements in similar size range. In fine ceramics and ceramic matrix application, the reinforcement size can be between 5 and 100 microns. Typically, the size of the reinforcement can vary between one-half of the average grain size of the matrix material and 5 or even 10 times the average grain size of the matrix material. As is apparent, the size of the aggregates is highly application dependent and a wide variety of sizes may be used.

The relative percentage of aggregate to matrix is also application dependent. However, it is thought that suitable material for a refractory concrete structure may, for example, contain about 85% aggregate, by weight, and 15% matrix material. The relative percentage of aggregate to matrix may change according to the application of the composition material.

When compared to the sphere, which is the idealized conventional standard, the available surface area per unit volume of the aggregates of the present invention is very high. Therefore, to achieve the same extent of conventional reinforcement advantages, use of a lower percentage of the novel aggregates is necessary. It appears, from theoretical considerations, that less than one-half the amount of aggregate conventionally used would be sufficient to obtain the same properties when these novel aggregates are employed.

As was considered above, using the Tetrajack, we can obtain a 77.39% gain in surface area over an equivalent volume of spherical aggregate. Therefore, when using these novel aggregate shapes, equivalent degrees of material properties may be expected by using approximately half the number of novel aggregate as compared to the numbers required for conventional spherical inclusions. Realizing that much higher packing densities can be obtained with these aggregates, the properties gained must be extraordinary when these aggregates are used in various matrices.

As noted, the aggregates tend to order themselves in a reticulated array when subjected to external forces. This ordering is relied on when fluid aggregate/matrix is pumped into a mold then subjected to pressure and sustained vibration. The optimum frequency of vibration and pressure/dwell parameters are application dependent.

However, it is sometimes desirable to array the aggregate in a deliberate fashion, without reliance on random processes. The present invention facilitates this by permitting aggregate to be inserted in a form in a predefined way, and thereafter be flooded (or pumped) with matrix material to fill the interstices of the earlier-arranged aggregate. By this technique, special orderings of the aggregate can be achieved to tailor the properties of the structure as required. The ordering of the aggregates may be conducted in one, two or three-dimensional arrays, as illustrated in, for example, FIGS. 4–6.

It is believed that the Tetrajack and Tetratwin will reticulate during the casting procedure when subjected to application dependent degrees of pressure and vibration. Once again, it is important to bear in mind that application dependency will dictate pressure, vibration and/or vibration sequence parameters for aggregate consolidation/dispersion (reticulation) within the matrix.

The Starjack, depending upon the application proportions thereof, may require a pre-ordering phase before the matrix infusion step (casting). However, the Starjack may be used without pre-ordering before subjecting the aggregates to the matrix material. Experimentation with this class of shapes has demonstrated that:

(1) When the side length of the base cube is less than the side length of the obelisk projecting from it, full reticulation without a pre-ordering step is hindered.

(2) When the side length of the base cube is substantially equal to the side length of the obelisk projecting from it, full reticulation without a pre-ordering step may be hindered.

(3) When the side length of the base cube is greater than the side length of the obelisk projecting from it, hindrance in packing (reticulation) is rarely observed.

In all cases, however, where this particular class of novel aggregate shapes is concerned, pre-ordering of the aggregate may be required if zero hindrance is to be guaranteed.

The refractories industry is believed to be one benefactor of this invention. Several types of high temperature refractories are used in metallurgical furnaces for melting metals and alloys, ladles, pouring sprouts, and molten metal carrier tubes and piping; and in glass melting furnaces. Other furnaces include heat treatment and remelt furnaces, and laboratory-type and other muffle furnaces. Different types of refractories are utilized in these applications. Other than the classical refractories which have been used traditionally, modern refractory practice utilizes reaction-bonded silicon nitride-silicon carbide ceramics and alumina, zirconia, alumina-zirconia, mullite, and magnesia among others.

All these refractories have inherent problems with relatively limited life because of a general lack of resistance to crack propagation due to thermal shock. Our invention mitigates these problems as mentioned above. When suitable aggregates according to the present invention, which are chemically compatible with the matrix (either single phase or composites containing multiple chemical species and phases), are fabricated using the techniques described herein, we believe that a higher resistance to crack propagation can be realized in most furnacing applications.

Furthermore, refractory cements of appropriate flow consistency can be made using any prior art technology which will include the novel aggregates in the composition of the gunnable and sprayable mix. These can be used to repair and extend the life of refractory walls of existing furnace linings of prior art materials.

An important refractory application is in making high precision molds for the fabrication of engineered articles of simple and complex shapes made of metals, ceramics, plastics, and composites thereof. A major problem of conventional techniques is the limited mold life because of mold breakage. We believe that ceramic, metallic, and plastic refractory molds that are made using the aggregates described here will exhibit superior mold life due to higher capacity to bear very high and variable loads, including loads due to static and dynamic vibrations.

Yet another application for our invention is the making of furnitures used in furnaces for stacking articles to be furnaced. All the current furniture materials are relatively weak and brittle and can not carry high loads. This limits the furnace load. However, when the furnace furnitures are reinforced with aggregates of our invention, the strength is increased considerably because of the load distribution within the composite made of our invention. This results in higher load bearing capability allowing higher levels of furnace loads, higher productivity and savings realized in furnace operating costs.

Cement-based materials have relatively high compressive strength. However, they have a low tensile fracture strength and a low value of strain relative to their tensile strength. Prior art has utilized the addition of fibers to greatly improve the tensile strain capacity of cement-based materials. (See, for example, "Mechanical Behavior of Fiber-Reinforced Cement-Based Composites," S. P. Shah and C. Ouyang, J. Am. Ceram. Soc. 74 [1] 2727–38, 2947–53 (1991)). These fibers are primarily made of steel, glass, or polymer. Carbon, asbestos, wood, cellulose, and different synthetic fibers have also been used in cement-based materials. Incorporation of up to 15% by volume is considered state of the art. Tensile strength is improved from approximately 4 MPa to approximately 15 MPa. Fibers stabilize microcracking and a homogeneous distribution of microcracks is achieved at very high strain levels (1% strain) which is two orders of magnitude higher than plain concrete.

A class of cement-based material which contains cement, silica fume, and steel microfibers has a bending capacity an order of magnitude higher than conventional reinforced concrete. The material properties of this advanced concrete approximate that of structural steel.

Although poorly understood, the mechanisms of fracture resistance involve the following aspects: i) the quasi-brittle nature of the matrix, ii) weaker interfacial zone between the fiber and the matrix, iii) strain localization in the matrix, and iv) the micro-mechanical aspects of microcrack initiation, interfacial cracking, and microcrack propagation.

The above mechanisms, which operate in prior art materials, such as the above-mentioned silica cement/steel fiber composites, and which provide enhanced strain-to-failure, are inherently statistical in nature. Variations of any kind in the microstructure of these cementitious materials will lead to substantial reduction in the enhanced strength and fracture resistance, thereby leading to operating uncertainties.

Our invention does not rely on any of these operating mechanisms for enhanced strength and fracture resistance. Because of their geometry and the three-dimensionally reticulate properties inherent therein, improved properties, and therefore, performance benefit,—may be obtained by using these novel aggregates in various cementitious and other matrix materials.

Polymer matrix composites are being employed more and more in the field of structural and part-oriented materials. Their light weight, impermeability, dielectric properties, ductility, resistance to high cycle stress fatigue, machinability, and net-shape forming ability make them suitable candidates for material selection in a widening range of applications. For conventional polymer-based compositions, the primary culprit in limiting resistance to crack propagation is the lack of interlamellar shear strength resulting from limitations of conventional reinforcement phases. Our novel aggregate shapes disclosed herein afford improved reinforcement phase opportunities for dispersion in this large polymer matrix area. Aggregate material selections for the polymer matrix field include but are not limited to: metals; metallic solid solutions; intermetallic compounds; ceramics; glasses; carbon and graphites; mica; other polymers such as plastics, synthetic rubbers, and organic resin compounds; cements; and cementitious materials.

Metals, alloys, and intermetallic compounds often utilize various ceramics for reinforcement purposes to enhance the modulus to effect higher stiffness. For example, it is common to use silicon carbide particles, platelets, and whiskers in aluminum, and aluminum-based alloys. We believe that instead of the two-dimensional reinforcements such as the platelets, whiskers, and fibers, or the three-dimensional reinforcements such as particles (which, however, have two dimensional effect as far as fracture resistance can be realized), the use of reinforcements of the current invention which reticulate three-dimensionally can provide improved reinforcement properties. As such, these materials can be used in structural applications such as aircraft structures.

The aggregates of the present invention can be used in wear-resistance applications such as mechanical seals, ceramic liners, bearings, thread guides, and pressure sensors. Other suitable applications include heat-resistant materials such as in ceramic engines including turbine blades, heat exchangers, radiant burner tubes, burner nozzles, and high-frequency combustion crucibles.

Compacted fibrous insulation is used as furnace walls in laboratory furnaces. Generally, these have very low strength and are capable of carrying little, if any, load. However, cracks are inevitable and propagate through the thickness. Although spalling does not occur in general, the presence of the crack leads to heat loss. We believe that when appropriate aggregates of our invention that are chemically compatible with the fibrous insulation are used, cracks if and when they originate do not propagate through the thickness of the fiber wall but instead are arrested somewhere within. This results in blind cracks with substantial reduction in heat loss from the furnace. The benefits are improved heat transfer to the ware, reduced heating time, reduced furnace power, and in general improved furnace life among others.

A requirement for many abrasive grains used for cutting and machining is that the ceramic abrasive grain be self-sharpening during use, thereby exposing the sharpness required for cutting and machining consistently instead of producing rounded particles on fracture and subsequent wear. The aggregates according to the present invention generally have sharp corners in them. It is expected that because of the way in which these aggregates are manufactured, they will retain their general geometry even after breakage, leading to the maintenance of sharp corners required in abrasive applications.

The function of the aggregate depends upon the particular application and the designed engineered material. However, in many cases the common and general requirements are that the aggregates be light (not heavy), highly dense (not porous), hard, strong, have relatively large surface area-to-volume ratio, and be compatible with the matrix both during fabrication and during service. Three-dimensional reticulation is a highly desired property which leads to a synergistic relationship between discrete elements under stress as well as performance isotropy.

In general, ceramics often withstand high temperature service better than metals, alloys, and polymers. Mostly, they are resistant to high temperature environments. A major reason for the use of ceramic materials as refractories for furnaces is their ability to withstand prolonged exposures to high temperatures. However, when rapid changes in the environmental temperature are encountered, which is termed thermal shock, substantial stresses can develop on bodies which are constrained and are not allowed to expand and relax. Ceramics that are manufactured with variable density through the cross section are prone to failure due to thermal shock. This is because the temperature distribution within the body is such that free expansion of each volume element would separate the individual volume elements so that they could not be fitted together. Since they are constrained within the same body, stresses arise.

Resistance to thermal stress fracture is called thermal shock resistance. It is known that such resistance is a function of external variables such as the stress level, stress distribution within the body, and the duration of stress, as well as intrinsic material properties such as the allowable strain-to-failure, extent of microstructural homogeneity, porosity, and pre-existing flaws.

Recognizing that manufactured ceramic articles have inherent flaws, studies have been made to understand how the flaw length (crack length) varies as the severity in the temperature differs. For thermal stresses less than that required to initiate fracture, no change in strength or crack length is expected. At critical stress level for fracture, the cracks propagate with high velocity, their length increasing and thereby decreasing the strength of the structure.

Two principal approaches are available for design and the selection of materials which are subjected to thermal shock in service. (Ref: Kingery, "Introduction to Ceramics.") The first approach is applicable to "fine" ceramics, such as those used for structural and electronic ceramics, and to "classical" ceramics, such as those used in glasses, porcelain, whitewares. Here, one avoids the fracture initiation as much as possible. The thermal shock resistance parameters appropriate under these conditions, (depending upon heat flow conditions) may be described as:

$$R = \frac{\sigma_f(1 - \mu)}{E\alpha} E\alpha,$$

$$R = \frac{k\sigma_f(1 - \mu)}{E\alpha}$$

where, $\sigma_f$ is the fracture stress, $\mu$ is the Poisson ratio, k is thermal expansion. Therefore, high values of strength and thermal conductivity, and low values of modulus and thermal expansion coefficient are believed to promote resistance to crack initiation.

We believe that our invention of unique and novel aggregates in the form of the Tetrajack, Tetratwin and Starjack, when appropriately used as second phase and/or matrix phase reinforcements, will show very high strength because of the nature of the geometric arrangement of the matrix and the reinforcement in highly reticulated fashion. The inherent stress distribution within such a body may lead to minimal tensile stresses and minimal isolated high tensile stresses that may occur while the body is in service. It is believed that these tensile stresses will resolve themselves into low values of shear and/or compressive stresses.

When ceramics are used as refractory bricks, a second approach is practiced wherein the crack propagation is voided. The thermal shock resistance parameters indicate 1) the availability of minimum elastic energy for crack propagation as given by:

$$R'''' = \frac{E}{\sigma_f^2(1 - \mu)},$$

and 2) the minimum distance of crack propagation on the initiation of thermal stress failure as shown by:

$$R'''' = \frac{E\gamma_a}{\sigma_f^2(1 - \mu)}$$

where $\gamma_a$ is the fracture surface energy. Therefore, in general, high values of modulus and work of fracture (fracture surface energy) and low values of strength promote crack propagation resistance. However, it should be noted that such materials cannot support moderate to high loads.

We believe that a major difference exists in the second approach using our aggregates in matrices as disclosed herein. Composite bodies using our aggregate according to the present invention have high modulus (depending upon the reinforcement/matrix combination for lower volume fraction of the reinforcement than comparable to prior art) and high fracture surface energy for reasons discussed herein.

Prior art technology introduced enough cracks of sufficiently large size (where it can be tolerated) to resist catastrophic crack propagation. By introducing microstructural inhomogeneities which serve as stress concentrators, fracture was allowed to take place locally, thereby avoiding catastrophic failure because of the small average stress in the material. As an example, intergranular shrinkage voids in $Al_2O_3$—$TiO_2$ ceramics serve to blunt initially sharp cracks and prevent their propagation thus providing better resistance to thermal shock damage.

We note that prior art has relied upon the existence of these inhomogeneities and large cracks within the body, thus compromising high strength and reliability. A major factor why ceramics have not met success thus far in the marketplace is this lack of reliability in properties and therefore wide scatter in performance due to inhomogeneities and cracks within the material. Our invention of the novel aggregates and composite bodies that use such aggregates as disclosed herein can serve to alleviate this problem. The overall stress in the composite body is reduced not by the distribution of the stress to localized areas by introducing inhomogeneities, but by inherently changing the tensile component of the principal stress to shear and compressive stresses. The tensile component is made to act along a very short distance after which it must resolve into components of stress that are substantially less in magnitude than the principal tensile stress. It can also resolve completely into compressive stress, a heretofore unknown phenomenon. This is a fundamental difference between the prior art and the novel composites made of aggregates disclosed herein. Prior art has limited developing crack front totuosity on a principally 2-dimensional plane. Composite systems employing aggregate of the claimed geometries will encourage if not demand that developing cracks pursue truly 3-dimensional paths. This mechanism should substantially increase the resulting fracture surface energy of the composite.

Pores which were introduced in prior art to reduce the degree of thermal shock damage and to substantially decrease the elastic energy stored at fracture are no longer a necessity. The damage caused by pores in materials is substantial, since pores reduce the material strength, lower the operating stress levels, reduce the strain at fracture, and reduce thermal conductivity.

The potential of the invention can be better understood by considering the general failure characteristics of engineered materials. In general, materials can be classified into three types, depending upon the behavior of fracture surface energy as the failure crack advances.

Materials exhibiting Type I load-deflection characteristics are extremely brittle and have fracture strength considerably lower than their theoretical strength. They have absolutely no tolerance for flaws that are either inherent in them or created during service. They exhibit purely linear elastic behavior up to fracture, after which they cannot sustain any load whatsoever, resulting in catastrophic material failure. In some instances, these materials can also show some limited non-linearity in the load-deflection characteristic just before the failure load. However, these materials also fail catastrophically after the attainment of the maximum load. Typical ceramics showing this behavior are those with fine-grained microstructure and excellent initial strength; however, these have typically low fracture toughness and generally fail by transgranular mode.

Materials that exhibit Type II load-deflection characteristics are brittle and have fracture strength considerably lower than their theoretical strength. However, they have measurable tolerance for flaws that are either inherent in them or created during service. They may exhibit purely linear elastic behavior up to fracture, after which they can sustain weak load; however, the load bearing capability will decrease continuously. Catastrophic failure is avoided as failure results as the main crack advances through the microstructure of the material over considerable amount of time. In fact, there may be opportunity to repair the failure-causing crack. In many instances, these materials can also show non-linear elastic behavior in the load-deflection characteristic just before the maximum load. Typical ceramics showing this behavior are those with coarse-to-large grained microstructures, complex microstructure with a wider distribution of grain sizes, and multiple phases and porosity; and, ceramic-matrix composites with continuous fiber reinforcements. These materials can have moderate-to-high strength; however, these have only moderate-to-high fracture toughness and generally fail by a combination of several mechanisms, such as crack deflection, crack bridging, fiber-bridging, secondary cracking off-axis to the main loading direction, and the like.

Materials exhibiting Type III load-deflection characteristics are also extremely brittle and have fracture strength considerably lower than their theoretical strength. They have no appreciable tolerance for flaws that are either inherent in them or created during service. They exhibit purely linear elastic behavior up to fracture, after which they can sustain load; however, in a decreasing manner. Although catastrophic failure is avoided temporarily, failure results as the main crack advanced through the microstructure of the material over time. In some instance, these materials can also show some limited non-linearity in the load-deflection characteristic just before the maximum load. Typical ceramics showing this behavior are those with medium-to coarse-grained microstructure, duplex-grained microstructure, and ceramic-matrix composites with particulate, platelet or short-whisker reinforcements. These materials can have moderate to high-strength; however, these have only moderate fracture toughness and generally fail by a combination of several mechanisms, such as crack deflection, crack bridging, whisker-bridging, and the like.

We believe Type II behavior will occur using composite materials of our invention during the majority of the crack propagation event.

The composite bodies made of our aggregate/matrix combination exhibit a high degree of reticulation of both the reinforcement and the matrix in three dimensions leading to substantial improvement in the tolerance of temperature differentials under operating conditions. The critical temperature differential, $\Delta T_c$, for the onset of rapid fracture appears to be given by the relationship:

$$\Delta T_C = \frac{(1 - \mu)K_{1c}}{E\alpha B(\beta)Y\sqrt{a_o}}$$

where, $K_{1c}$ is the critical stress intensity factor at the onset of catastrophic failure, Y is a shape factor characteristic of the flaw contributing to failure, $a_o$ is the flaw dimension, and $B(\beta)$ is the Biot modulus related to the body dimensions.

Because of substantial improvement in the fracture toughness property, we believe novel composite materials made using Tetrajack, Tetratwin, and Starjack aggregates increase the temperature differential required for catastrophic failure. Such materials can be used as very high temperature refractory bodies and those that are subjected to temperature extremes in relatively short time durations such as reentry materials in aerospace and other applications.

Increasing the strength of metallic materials by finely-dispersed second phase particles has been practiced for a long time. Both in-situ precipitated particles, and those that can be incorporated as particles are known. When particles of higher elastic modulus than the matrix are utilized, the composite modulus is increased relative to that of the unreinforced matrix. This mechanism requires an effective stress transfer to the dispersed phase.

The three-dimensionally reticulate nature of the aggregates of the present invention considerably increases the nature of stress transfer into the body of the ceramic aggregate. The manufacture of, for example, silicon carbide Tetrajacks and their incorporation into a matrix material such as an aluminum metal matrix, is believed to improve the strengthening of the resulting composite considerably more than heretofore demonstrated in the art. Other dense, hard and microstructurally engineered similar ceramic aggregates can also be incorporated into other metals and alloys and intermetallics to achieve similar improvements in strength and stiffness. Further, appropriate selection of aggregate/matrix combinations can also be practiced in order to improve strength.

The differential thermal expansion mismatches of the two bodies are relevant for consideration. If $\alpha$ represents linear thermal expansion coefficient and, $\sigma$ the tensile stress, then the contributing factor due to differential thermal expansion is understood to be represented by the formula:

$$-\sigma_r = 2\sigma_t = \frac{\Delta\alpha\Delta T}{(1 + \nu_m/2E_m) + (1 - 2\nu_p/E_p)},$$

where $\sigma_r$ is the resulting radial tensile stress, $\sigma_t$ is the resulting tangential stress, v is the Poisson's ratio and the subscripts m and p refer to the matrix and the reinforcement particulate property respectively.

If $\Delta\alpha$ is negative and the aggregate/matrix interface can support the resulting tensile stresses on cooling from the fabrication temperature, the surrounding matrix will be subjected to tangential compressive stresses and the matrix may be strengthened. If $\Delta\alpha$ is positive, matrix microcracking is expected when the value of $\sigma_t$ exceeds the tensile strength of the matrix. These idealized conditions appears to apply only selectively to spherical particulates. In the case of our aggregate, however, it can be expected that the stresses will be distributed toward the center of the aggregates because of the nature of the reinforcement geometry and its relationship to the total composite. Therefore, advanced strengthening can be expected.

The differential thermal expansion coefficient is a very important parameter in most composite systems since it often determines the final state of stress in the fabricated composite. In oriented composites where the reinforcements take preferred orientation either due to the nature of fabrication or due to their inherent shape such as whiskers and fibers, four theoretical possibilities seems to exist:

1. The $\Delta\alpha$ is positive in the axial direction: When the stresses are large enough, a network of fine microcracks develops in a direction perpendicular to the fiber axis.

2. The $\Delta\alpha$ is negative in the axial direction: When the fiber/matrix interface is strong, strengthening is observed. However, if the interface cannot support the imposed stress, then no matrix pre-stressing can be expected and voids may be initiated at the end of the fibers.

3. $\Delta\alpha$ is positive in the radial direction: This will result in compressive stress at the interface and would result in the strengthening of the chemical or mechanical (frictional) fiber/matrix bond.

4. $\Delta\alpha$ is negative in the radial direction: This typically results in interfacial decohesion.

From the above considerations it appears that reinforcements having the capacity to reticulate equally in three dimensions are preferred in the development of high strength composite structures where thermal expansion issues have been a constraint in the prior art (e.g., very large ceramic structures such as containment vessels for chemical and nuclear waste).

The interactive and mutually supportive properties of these shapes and their inherent tendency to resolve tensile stress inward renders them capable of accepting more stress and is one aspect of the novelty of this invention.

Crack path tortuosity is directly related to the resistance to crack propagation which delays the break of the material. Therefore catastrophic failure is avoided in service when crack growth is slow enough that it can be observed and dealt with before failure occurs.

Typically, ceramics fail in brittle fashion when the applied load reaches the break load, which is determined by a pre-existing flaw in the body (the so-called Griffith flaw). In the realm of fracture mechanics, the stress magnification at the tip of the flaw opening often determines failure. As the applied load, which is perpendicular to the crack plane, is increased, the flaw opening increases and so does the stress intensity factor, $K_I$. This stress intensity factor reaches its critical value, $K_{IS}$ at which the body can not sustain further load and catastrophic failure occurs.

On the other hand, when the brittle ceramic structure is reinforced properly with particulates, platelets, whiskers, and short and long fibers, either separately or in various combinations thereof, the applied load, which is normal to the crack plane resolves into various components following the crack front contour, and is resolved into the crack opening stress which is less than the original stress. This factor, as well as the cracking out of the original plane, seems to contribute to increased fracture energy requirement. Thus, the crack front tortuosity results in Type II and Type III behavior.

In summary, the Type I behavior contributes to complete brittle fracture which is termed catastrophic. In these types of materials, the major energy for fracture is due to crack initiation with very little energy spent on crack propagation. The Type II and Type III behavior, on the other hand have substantial crack propagation energy as the contributing energy to the total fracture surface energy.

When the reinforcement phase is stronger than the matrix, the failure of the material can initiate in the matrix phase and propagates through the matrix grains. However, in reality, because of the discontinuous matrix phase, the propagating crack often meets resistance when it encounters the second-phase reinforcement. At this juncture, the properties of the matrix-reinforcement interface determines the nature of further advancement of the crack. If the interface is the weakest of the three entities, then failure occurs through the interface. As will be explained later, in ceramic matrix composites it is customary to design this interface to be the weakest in order to increase the crack surface area or the crack tortuosity.

When discrete second phase particles are utilized, the crack tortuosity is determined by the geometry of the reinforcement phase, its volume fraction, its deviation from uniform-sized nature, dispersion distance, orientation relative to the applied stress and the propagating crack, and the uniformity in the properties of the second phase such as density, hardness, Young's modulus, and the variability of the interfacial strength along the boundary of the second phase and the matrix. Therefore, the science of crack propagation is complicated and is governed by both global and local events that can occur in a given material. There is an abundance of scientific theories; however, particulate crack propagation events always require careful interpretation and intuitive judgment.

Second phase materials of spherical geometry have been studied extensively because of their simplicity and relatively easy modeling and analysis. Other shapes that have received attention are: the ellipsoids, the platelets, the short fibers or whiskers, and the long discontinuous and continuous fibers. The architectural arrangement of these reinforcements to obtain the best tortuous crack path has been studied both theoretically and experimentally, especially in the case of continuous fiber reinforcement.

Several mechanisms have been found to influence crack tortuosity such as: crack deflection, crack branching (both in-plane and out-of-plane of the crack surface), short-fiber pull-out, and crack bridging.

These mechanisms, when active, contribute to energy versus crack length behavior. Type I materials have a constant fracture energy as the crack advances. No additional energy is required. Examples of such materials are monolithic aluminum oxide, silicon carbide, and silicon nitride. For Type II materials, additional loading is required to fracture, since the fracture surface energy increases with the advancing crack front. In other words, resistance to crack propagation is met even though crack initiation was easy. Such a behavior is known as the rising R-curve behavior. (The "R" refers to resistance to crack propagation).

The R-curve behavior varies for different materials and different types and microstructural design of the reinforcements. Examples of such materials are coarse-grained graphites such as used in electrode applications in the arc melting of metals and alloys. Limited rising R-curve has also been demonstrated in transformation-toughened zirconia, zirconia-toughened alumina, whisker reinforced silicon carbide, titanium diboride particulate reinforced silicon carbide, titanium carbide particulate reinforced silicon carbide, and self-reinforced silicon nitride in which needle-shaped grains are formed in-situ.

In Type-III materials, although the failure is not catastrophic, no additional load or energy is required to propagate the advancing crack. An example of such material is fine-grained graphite such as used as a connector for electrode grade graphite for continuous operation and even finer grained graphites which are used in noses in aerospace applications.

The geometry as well as the reticulated microstructure of our aggregates are unique in composite systems in terms of the nature of stress transfer at the interface and in the vicinity of the interface between the aggregate and the matrix. Let us first consider the prior art. When spherical aggregates are embedded in a matrix, depending upon the nature of the thermal expansion property, the crack can be either arrested or deflected.

When the normal expansion of the second phase is higher than that of the matrix, cracks can bow as well as deflect around the circumference of the spherical second phase, provided that it is a rigid inclusion with elastic modulus and hardness values higher those of the matrix in which it is embedded. Around the spherical aggregate, compressive hoop stresses exist which causes the crack plane to change direction. Radial tension, however, still prevails causing further crack propagation. When the spherical second phase is a rigid inclusion with elastic modulus and hardness values higher than those of the matrix into which it is dispersed, and its thermal expansion is lower than that of the matrix material, the matrix shrinks around the inclusion resulting in hoop tensile stress around the inclusion. This results in compressive stress at the crack plane and therefore, crack advance is limited. It should be noted that in both these instances, although the reinforcing phase is three dimensional (sphere), the effect on stress distribution as far as the advancing crack is concerned, is two-dimensional.

In reality, the hoop tensile stress is never uniform around the inclusion due to various fabrication and non-uniform dispersion effects. Therefore, complete crack arrest is never achieved.

Similar theoretical considerations apply for the case of ellipsoidal aggregates and whiskers and short fibers and combinations thereof. However, these aggregates exhibit two-dimensional orientation effects. In many instances, because of hindered packing as noted in a previous section, high volume fraction loading of these two-dimensional aggregates in matrices is not achievable. Moreover, the stress distribution around the whiskers and continuous fiber reinforcements is such that most composites made using these fail in shear because they have practically negligible shear strength. When the compression is applied axially to composites with continuous fibers, buckling failure may occur again due to poor shear strength capability.

Random orientation of whiskers has been tried in prior art in order to simulate three dimensional distribution. However, this results in improvement in fracture energy which is less than that obtained in two-dimensional, oriented dispersion. For example, Haiyan Liu, Karl L. Weisskopf, and Günter Petzow ("Crack deflection process for hot-pressed whisker-reinforced ceramic composites, J. Am. Ceram. Soc. 72, [4] 559-63 (1989)) have shown theoretically that for a given aspect ratio of the whiskers (for example, length=12 times the diameter), three-dimensional dispersion yields four-fold increase in fracture toughness over the unreinforced body. Two-dimensional dispersion, on the other hand, yielded above sevenfold increase in fracture toughness over the unreinforced body.

Many processes utilizing whiskers have introduced toughening. Usually the increased toughness is the result of crack deflection and whisker bridging, a process that involves elastic, frictional, and pullout bridging of the crack (see, for example, "Matrix-grain bridging contributions to the toughness of whisker-reinforced ceramics," J. Am. Ceram. Soc. 74[9] 2131-35 (1991)).

For effective whisker bridging, the strength, radius, and volume fraction of the whiskers, the ratio of the elastic properties of the composite and matrix to that of whiskers all should be optimized. Thus under uniaxial and multiaxial service stress, to enhance fracture toughness one should select whiskers with high strengths, large diameters, and smooth surfaces (e.g., to minimize stress concentrates and enhance interfacial bonding).

Prior art dispersions are varied in size, shape, and dispersion uniformity. Theoretical modeling has shown that such variations decrease the toughening efficiency. (See, for example, S. G. Seshadri, M. Srinivasan, and K. M. Keller, "Numerical computation of toughening increments due to crack deflection in particulate composites," Ceram. Eng. Proc. 8, [7-8] 671-684 (1987)).

In the preferred embodiments of our invention, the geometry of the aggregate, as well its inherent natural ability to reticulate in all three dimensions, often dictates the stress transfer in an entirely different fashion. Although general considerations regarding differential thermal expansion between the aggregate and the matrix in which it is embedded still apply, the stress distribution around the aggregate in three dimensions dictates that the tensile stress initially imposed on the crack plane be converted to shear component and eventually into compressive component as it advances around the aggregate. It is believed that this tortuous crack path routing can arrest the crack completely. The reticulate distribution of the aggregate ensures that this occurs within a very short duration of crack initiation and crack propagation. Additionally, the three dimensional reticulation and the stress transfer which is dictated by geometry ensures that composites made using these novel aggregates in various matrices disclosed herein have high shear strength.

Another unique feature of the composites according to the preferred embodiment of our invention can be described as follows: When conventional "soft" aggregates are used in prior art, namely aggregates with hardness value less than that of the matrix, the crack can go through the aggregate essentially with no improvement in fracture toughness property. Aggregates according to the preferred embodiment of our invention allows the utilization of "soft" aggregates in a "hard" matrix where the hardness of the aggregate is less than that of the matrix. This is because the stress distribution around the reticulated aggregate is truly distributed in three dimensions. Furthermore, it should be noted that the nature of the reinforcement technology advanced in this invention often results in the three dimensional reticulation of the matrix also, which contributes to crack arrest by the harder matrix. For example, even though zirconia has hardness property much less than silicon carbide, aggregates made of zirconia can be used to reinforce silicon carbide matrix. The geometrical effect discussed above, as well as the well-known transformation toughening within zirconia resulting from the stresses of the advancing crack it believed to contribute to improved fracture toughness of the silicon carbide material. This is thought to be an important advance since there are not many inorganic compounds which are harder than silicon carbide, which is a requirement in prior art in order to improve the reinforcement and crack resistance capability of many materials.

We believe that aggregates of the class discussed herein such as the Tetrajack, Tetratwin and Starjack, when appropriately reinforced in matrix materials, will contribute to far superior Type II behavior than heretofore achieved.

Typical fracture surface energies for Type I behavior are in the range of 5 to 100 $J/m^2$. Typical fracture surface energies for Type II behavior are in the range of 500 to 2000 $J/m^2$. Typical fracture surface energies for Type-III behavior are in the range of 100 to 500 $J/m^2$. We expect that the technology discussed herein will result in fracture surface energies in the range of 500 to 5000 $J/m^2$. When properly fabricated, engineered materials employing these novel aggregates may be expected to yield fracture surface energies in excess of 10,000 $J/m^2$.

We also believe the employment of these aggregates will provide a completely different fracture behavior in materials. As was mentioned previously, it is customary to have a weak matrix reinforcement interface (weaker than either the reinforcement or the matrix) in ceramic composites in order to force fracture paths along the interface to achieve tortuosity of fracture surface. The preferred embodiment of the present invention does not require a weak interface per se. Because of the reticulation properties of the aggregate, the matrix is also reticulated. Because inherently stronger aggregate are used compared to the weaker matrix, failure in the matrix is allowed. The reticulated and tortuous macrostructure of the matrix will contribute substantially increased tortuosity of matrix failure compared to prior art and materials failure behavior. Additionally, the requirement of weak interface in prior art materials has led to materials that are not particularly strong. Further, when matrices of composites are themselves composed of single or multiple fractions of the disclosed aggregates the matrix microstructure itself will contribute to substantially increased crack path tortuosity.

We therefore believe that materials which are both strong and tough may be fabricated using the embodiments in accordance with the present invention.

The requisite of a strong interface for strength and a relatively weak interface for toughness has sometimes been met by using a duplex fiber element. Here, the reinforcing fiber element consists of a cylindrical outer sheath which is strongly bonded to the matrix and surrounds the inner core of the fiber which is less strongly bonded to the sheath. When failure of the outer sheath occurs, pull-out effects are obtained between the sheath and inner fiber element. It should be remembered that such a processing complexity leads to uncertainties in fabrication, design, and failure prediction methodology, in addition to the inherent orientation effects.

We therefore believe that products superior to this prior art in terms of fabrication, design, predictability of performance, and performance may be composed by using the novel reinforcements herein described.

Composite materials according to the present invention also mitigate several other problems encountered in conventional fiber composites where, thus far, the highest fracture surface energies have been obtained. If fibers are randomly oriented, many of them will cross the fracture plane obliquely and be subjected to bending moments. When brittle fibers are used, this will lower the applied tensile stress required to fracture the fibers. If fibers make a small enough angle to the fracture plane they will be unable to pull out, at least initially, and will either fail in shear, or will break through the matrix. Also, with randomly oriented reinforcement, some fibers will lie approximately perpendicular to the tensile axis and may act as stress-concentration sites, particularly if bonding is weak, consequently reducing the strength of the composite.

Thus, another benefit we contemplate is that the compromise between strength and fracture toughness which has been the abiding requirement in prior art is no longer necessary using our aggregates and using the reticulated arrangements of both the matrix and the reinforcement disclosed herein.

In other words, material systems employing these aggregate and the reticulate matrix resulting from the use thereof afford such a robust improvement in material strength and fracture toughness that a much higher degree of flaw incidence (either fabrication or service-induced) may be tolerated without the threat of catastrophic failure to the composite body.

Refractory materials in the shape of the aggregates of the present invention may find applications beyond merely serving as aggregates in a structural matrix. For example, the "chain" of FIG. 5 can be strung together by drilling (or molding) a hole (which may be threaded) through the central base of the component elements, and then threading them as depicted onto a cable (or threaded rod). Such a cable of refractory elements finds many applications in material handling settings, particularly those involving high temperatures or corrosive environments.

Aggregates according to the present invention find many applications. One is in ceramic structures. In accordance with this aspect of the invention, a matrix/aggregate material is formed, extruded and/or molded into a desired shape. An example is a 2000 liter vessel for the storage of nuclear wastes. Economic as well as technical considerations will determine specific aggregate/matrix compositional choices. Thus, the vessel would be composed of predominately alumina materials designed to achieve their optimal strength at temperatures exceeding 2300° F. Lower temperature ranges and other matrix/aggregate materials can also be used.

Under agitation, which may be from mechanical, ultrasonic, microwave, or a combination of these sources, the aggregates according to the present invention tend to order themselves into a reticulated array. This effect is heightened under pressure. Processing while in the fluid stage also reduces internal stresses remaining after later firing, by erasing density gradients that result from the material having become deposited in the mold.

Examples of potential applications in the field of fine ceramics include but are not limited to: high temperature furnace linings, bricks, tundishes, electrodes, electronic substrates and other forms of heat sinks, emission control catalyst carriers, catalytic bed components, ceramic capacitors, thermistors, varisters, piezoelectrics, heat and fracture-resistant structural materials, heat engine components, diesel and gas combustion engine components, high-temperature bearings, transport rollers and gas and molten metal transport pipe, wear resistant materials (e.g., mechanical seats, thread guides, liners, sand blast nozzles), cutting tools, high-temperature or corrosive environment sensors, bone replacement, artificial joints, tooth implants, separators for biological components, transparent windows, mirror substrates, tools and jigs, abrasives, turbine blades, precision instrument parts, filters for high-temperature and corrosive materials, insulators, wave guides and transducers.

In the field of high-temperature thermoplastics alone, it is believed that benefits can be obtained by employing the principles of our inventions. Beneficiaries include, but are not limited to: liquid crystal polymers (LCPs) with high chemical, radiation, weathering, and burn resistance, as well as heat deflection properties; polyamide-imide (PAI), resistant to solvents with good wear and friction resistance; polyarylate, which is tough, flame retardant, and resistant to ultraviolet light as well as dimensionally stable; polybenzimidazole with good compression strength and dimensional stability; polyetherimide (PEI) with chemical and creep resistance; polyethersulfone (PES) with good hydrolytic stability, chemical resistance, and heat deflection properties; polyimide (PI), excellent toughness, heat deflection, and chemical properties; polyketones, chemically resistant, strong and stiff; polyphenylene ether (PPE); polyphenelyne sulphide (PPS); polyphenylsulfone; polyphthalimide (PPA); polysulfone (PS); polyetherketone (PEK); polyetheretherketone (PEEK); and polyetheretherketoneketone (PEEKK).

A variety of methods and apparatuses may be used to make the aggregates shown in FIGS. 1–6. As an illustration, the aggregates may be made according to the flow chart of FIG. 7 and the schematic diagram of FIG. 8. In general, the aggregates can be molded between lower and upper mold halves each containing a suitable mold surface. The details of each processing step are described below.

The aggregate production process begins with material selection, alumina (in the present case), with a sintering aid phase (in the present case, magnesium oxide), and a binder phase (in the present case, a complex of polyethylene glycol compounds, aluminum chloride, stearic acid and deionized water).

The constituent ingredients are dry mixed, then high shear blended and press formed into thickness-controlled sheets from which will be cut charges specific to the volume requirement of the employed mold (130).

The cut charge is placed in the mold (132). The platen (upper mold half) is lowered into contact with the charge and vibrated (so as to reduce viscosity of the charge), while continuing to be lowered until full contact with the lower mold half has been achieved (134).

Ram pressure on the mated mold halves is increased. Vibration frequency and/or amplitude in increased until full displacement of material into the mold cavities has been accomplished (136).

Vibration and pressure are discontinued (138). The mold halves are separated and the press formed fabric of parts is removed from the mold. The fabric is observed for obvious flaws and either discarded or stacked for debindering and sintering (140).

Considering the small cross-sectional size of the aggregate (in the present case, 0.06 cm), a prolonged debindering phase is not considered, and the sheet of nested aggregate may be simply stacked with other like elements or otherwise disposed into a furnacing environment for sintering.

Sintering of alumina may be accomplished at a wide range of temperatures. From 1400° to 1650° C. is considered appropriate, though lower and higher temperature regimes have been utilized and are common in the art (142).

After furnacing, the sintered sheet or fabric of parts (in the present case, aggregate) is removed from the furnace and inspected for flaws (144) before being crushed between pressure-controlled rollers (146) (so as to release the aggregate from the surrounding web/flash).

The crushed flash is then screened (148) from the aggregate before the aggregate are passed into an abrasive slurry-filled tumbling device where the jagged remains of the part line are removed.

The aggregate, having been tumbled, are then subjected to a final quality control step (152) before being weighed and bagged for inventory and/or shipment (154).

Referring to FIG. 8, in a preparation portion 100, a suitable raw material 102 is prepared. The raw material 102 may include a variety of materials such as the aggregate materials described above. The prepared raw material 102 is placed into a closable mold 104 being in an open position. The mold 104 is partially closed so that a gap 106 is defined between a lower mold half 108 and an upper mold half 110. The mold 104 and raw material 102 are subjected to vibration V and pressure P. The mold 104 is then fully closed under pressure and vibration. The pressure P and vibration V is then stopped and the mold 104 is opened so that a fabric 112 made from the raw material 102 may be removed therefrom. At this stage, the fabric may undergo a quality control procedure.

As described in detail below, the fabric 112 comprises a web of aggregates or parts. A stack 113 of such fabrics may be placed in a sintering device 114 such as a furnace for sintering and removing binders from the fabrics. It is believed sintering and molding may be performed as a continuous process. The fabrics are removed from the sintering device 114 after they have been sintered. Optionally, the sintered fabrics undergo another quality control procedure. Each fabric 112 preferably is inserted into a nip 117 between a pair of rollers 118, 120 to break up the fabric into unfinished parts 122. The parts 122 are screened in a screener 124 to remove parts smaller than a predetermined size. The screened parts may be placed in a tumbler 126 to remove sharp edges and other undesirable portions of the parts. The quality of the tumbled parts may be checked before packing the aggregates for shipping at 127.

Figure 10:
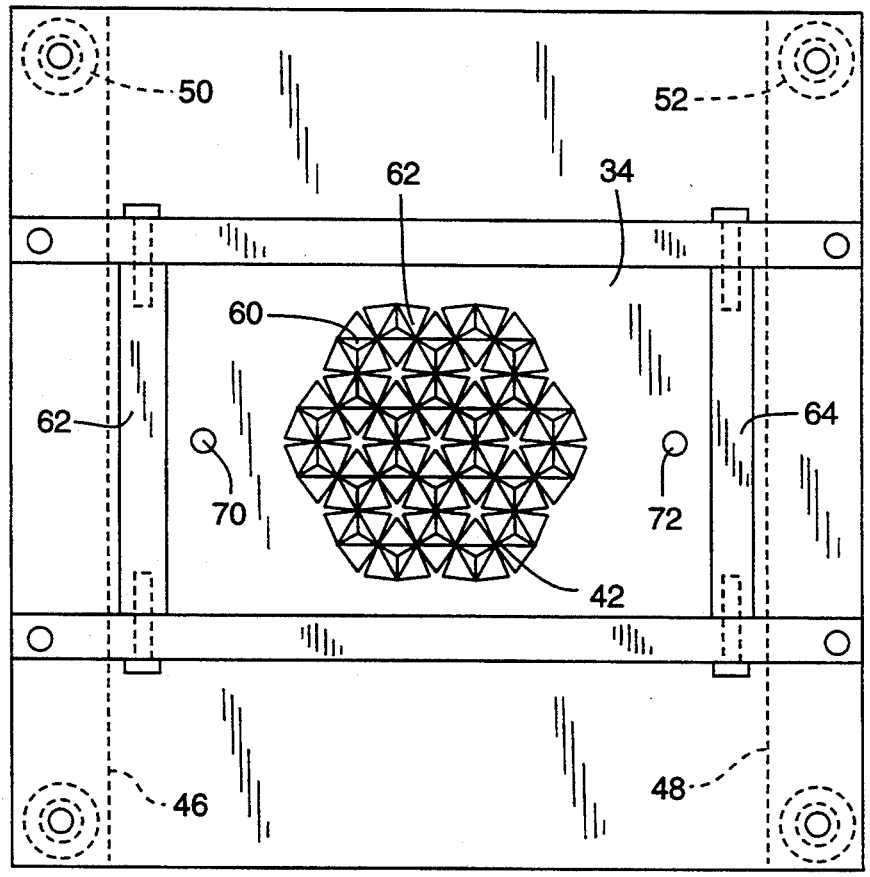
FIG. 10 shows a top view of the embodiment along line 10—10 of FIG. 9.
Figure 9:
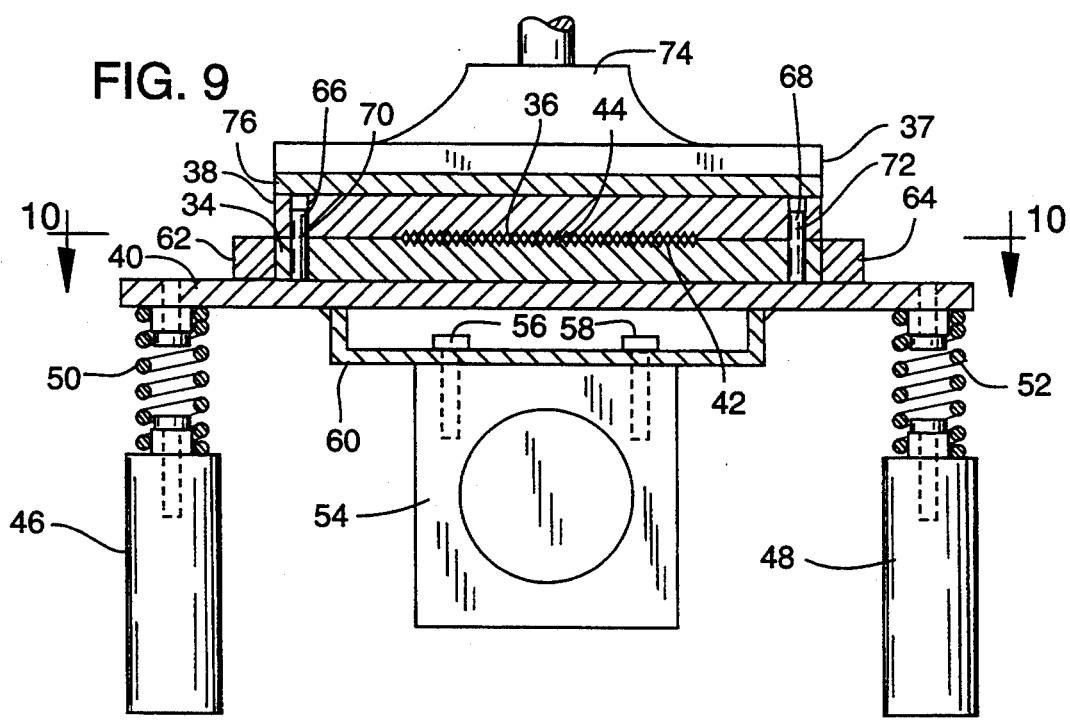
FIG. 9 shows a cross-sectional view of an apparatus according to one embodiment of the present invention.

The parts or aggregates may be prepared in a variety of processes including continuous and batch processes. A mold apparatus 37 suitable for a batch process is shown in FIGS. 9–10. The molding apparatus includes lower and upper mold halves 34, 38. The lower molding half 34 is supported by a horizontal platen 40 and includes a lower molding surface 42, described in detail below.

The molding halves 34, 38 are movable between open and closed positions so that a specimen 44 placed therebetween may be molded according to the shape of the molding surfaces 36, 42 when the molding halves 34, 38 are in the closed position.

A suitable specimen or feed material, such as alumina, may be prepared in a variety of processes such as a casting process. As is apparent, other feed material may be used, such as the materials suitable as aggregate materials as described above. Preferably, the feed material has a ball-in-hand consistency. In the illustrated method, portions of the feed material are placed onto mold surface 42 of the lower mold half 34.

The molding apparatus 37 includes vertical support columns 46, 48 for supporting an underside of the horizontal platen 40 extending between the support columns. Between the supporting columns and platen are disposed shock absorbing spring means 50, 52 disposed. The spring means 50, 52 are preferably coil springs that are stiff enough to prevent contact between the platen 40 and the support columns 46, 48 when the platen 40 is subject to load. Pressure controlled air or hydraulic shocks may also be used. A vibrator source 54 may be attached by mechanical fasteners such as bolts 56, 58 to a central portion 60 attached to an underside of the platen 40. A variety of vibrators may be used such as mechanical, ultrasonic, microwave or combinations thereof.

The lower mold half 34 is positioned on the platen 40 between a pair of die holders 62, 64. The mold half 34 has the mold surface 42 facing away from the platen 40. The upper mold half 38 is positionable on top of the lower mold half 34 so that the corresponding mold surface 36 faces the lower mold surface 42. Both the upper and lower mold halves have dowel receiving openings 66, 68 formed therethrough for receiving dowel pins 70, 72.

The upper mold half 38 is in the preferred position when the dowel receiving openings of the lower mold half are aligned with the dowel receiving openings of the upper mold half so that dowel pins 70, 72 may be inserted therein. The dowel pins 70, 72 assure proper alignment of the upper mold half 38 relative to the lower mold half 34.

A ram assembly 74 is disposed above the upper mold half 38. The ram assembly 74 may have a rubber layer 76 on an underside thereof. The ram assembly is movable in the vertical direction to exert pressure on the molding halves and the raw material when the mold 37 is in the closed position.

The molding halves may be made of steel, iron, aluminum, glass, quartz, lucite or any other equivalent material having low characteristic acoustic impedance. For example, the characteristic impedance may range from about 2 million $p_0c$ to about 50 million $p_0c$. It is apparent that other characteristic impedance ranges may be used.

In the preferred embodiment, the lower molding half 38 is substantially stationary and the upper molding half 34 is movable in the vertical direction by the ram assembly 74.

Figure 11A:
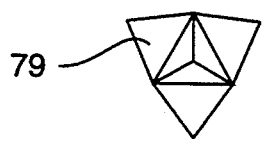
FIGS. 11A-C show corresponding bottom views of a fabric according the present invention.
Figure 11B:
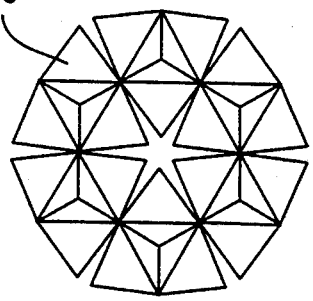
Figure 11C:
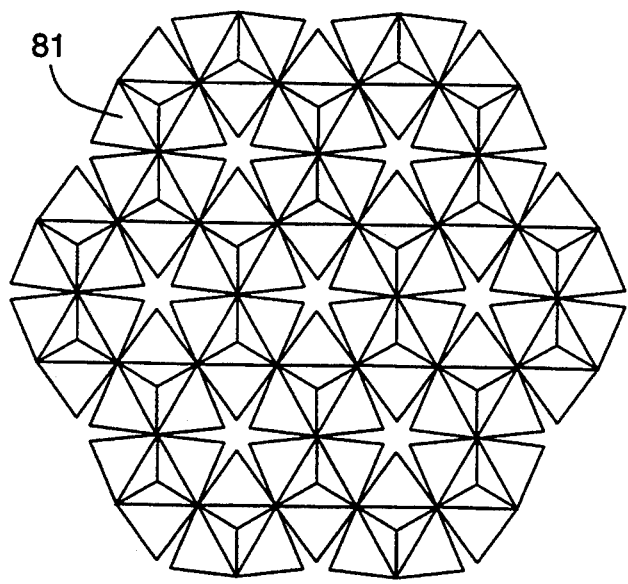
Figure 12A:
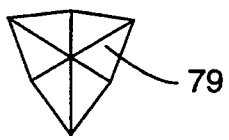
FIGS. 12A-C show top views of the fabric of FIGS. 11A-C.
Figure 12B:
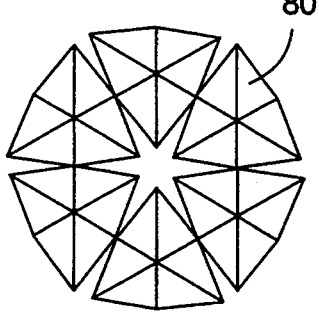
Figure 12C:
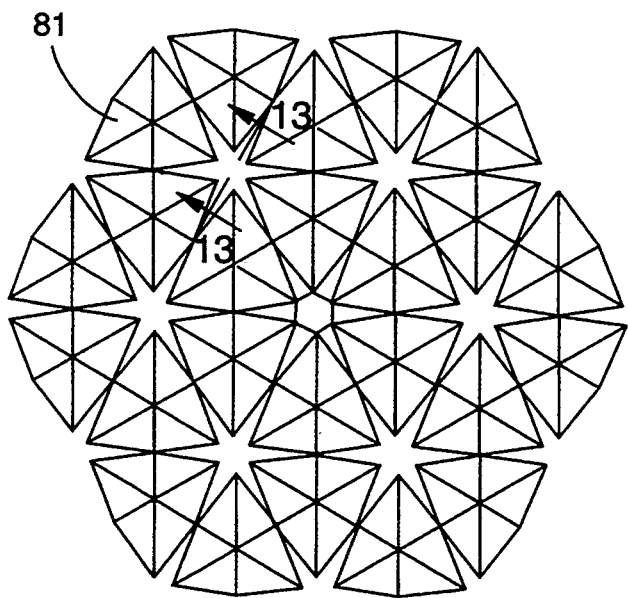
Figure 14:
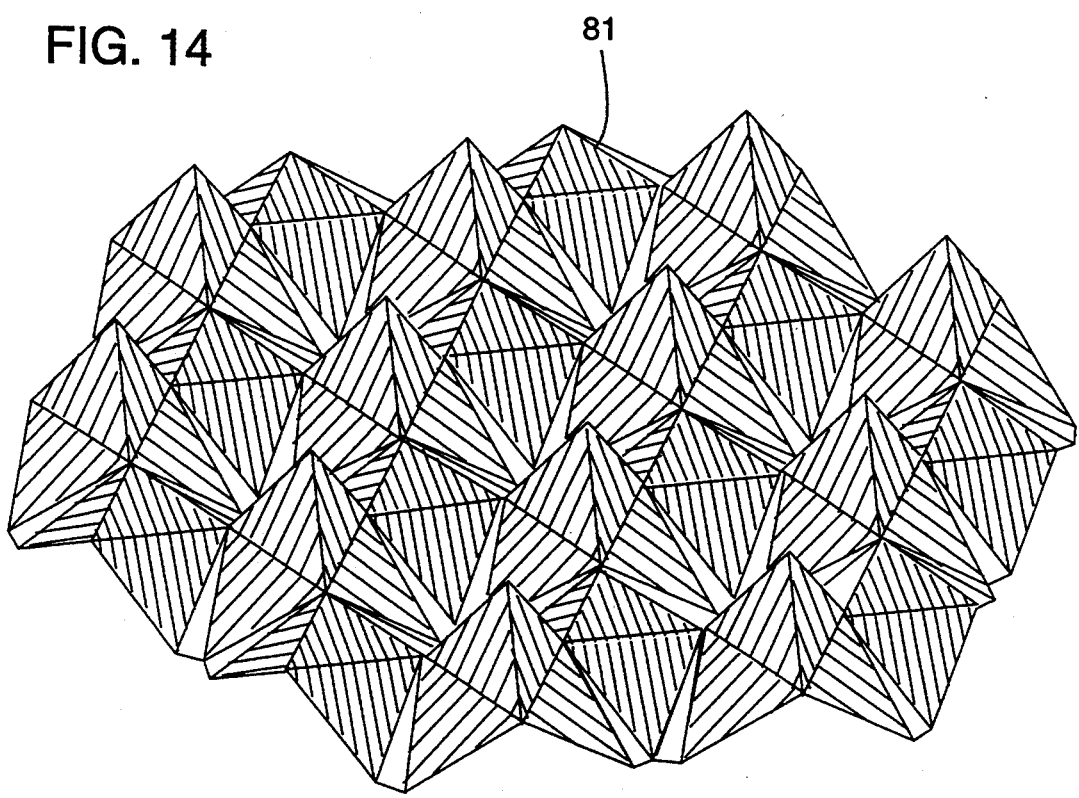
FIG. 14 shows a perspective view of the fabric of FIG. 12.

Molding surfaces 36, 42 may have a variety of mold patterns such as a pattern for making a plurality of Tetrajack (in the present case), Tetratwin, Starjack, or other three-dimensionally reticulate aggregate classes which fall within the scope of this invention. For example, FIG. 10 shows a mold pattern for making Tetrajack shaped aggregates or parts. The mold surface 42 includes cavities 60 and contact points or bosses 62. Similarly, the mold surface 36 has cavities and bosses so that when the mold halves are closed, a semirigid sheet or fabric 81 (FIG. 14) having a plurality of aggregates or parts 70 formed therein can be produced. FIGS. 11A-C shows bottom views of a Tetrajack 79 (FIG. 11A) and a Tetrajack fabrics 80, 81 (FIGS. 11B and 11C). FIGS. 12A-C show top views of each respective Tetrajack 79, Tetrajack fabrics 80, 81.

In general, the upper molding surface 36 may include contact points or bosses for contacting corresponding lower contacting points of the lower molding surface 34 when the mold 37 is in the closed position. The molding surfaces also include cavities having a variety of shapes.

Figure 13:
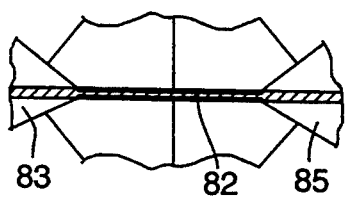
FIG. 13 shows a side view along line 13—13 of FIG. 12C.

The vibrator 54 may be activated to vibrate the mold halves 34, 38 and the specimen 44 placed therebetween. The vibration reduces the viscosity of the specimen to ensure that all the cavities in the mold surfaces are filled by the specimen. The upper mold half 38 may be pressed against the lower mold half 34 until the mold halves are closed. Both mold halves may optionally be subjected to more vibration for a predetermined period of time. The mold halves are then separated so that the molded specimen or fabric may be removed therefrom. The fabric contains a plurality of aggregates, such as Tetrajacks 83, 85, held together by thin sections of webbing 82 (best seen in FIG. 13) described by part lines of the two mold halves.

The mold surfaces may be made in a variety of ways. According to one aspect of this invention, CAD/CAM design and fabrication techniques can be employed to produce graphite electrodes of nested aggregates. This electrode is used in an Electrical Discharge Machining (EDM) process to "burn" the mold surface detail into steel or aluminum plates. The plates are then superimposed upon a base mounting and a platen affixed to a pressure controlled ram.

The specimen or raw material 44 (powder blend, extruded or cast tape, slurry or spray deposition) preferably is introduced or deposited on one or both of the mold surfaces 36, 42. The ram 74 is then lowered to designed pressure, dwell, and proximity tolerances. The ram is then raised and the nested aggregate, suspended in the web/matrix may be removed from the casting environment.

In accordance with a further aspect of the present invention, the base mounting and/or the platen may serve as a source for vibrational energy and/or vehicles for same. The exact specifications of vibrational energy such as type, amount and dwell are dependent entirely upon the candidate application. As an example, the manufacture of alumina aggregate to be employed in an advanced refractory concrete application may be considered.

Where mechanical vibration (random and variable frequency/amplitude) is concerned, it is believed that aggregate size and structural property requirements may determine the choice of the vibrational constituents. For instance, if the aggregate under consideration is large, over five centimeters, for example, and the application is non-critical, then mechanical vibration serves to sufficiently homogenize the green body at a moment of formation (MOF). Additionally, the process of vibration lowers the viscosity of the specimen due to increased collisions at the molecular level. For more demanding applications such as fine ceramics, heat engine components and high-temperature refractories, aggregate dimensions may be much smaller, less than 0.3 centimeters, for example, and the wavelength/amplitude factors generally associated with mechanical vibration may be inadequate to successfully homogenize the constituent materials in the green body.

In all cases it is important to remember that application dependency is the key to designing vibrational parameters for specific materials. Some very large aggregate may be considered for use in critical applications. In that case ultrasound as well as mechanical vibration, in concert with microwave and other electromagnetic energy forms may be considered.

In effect, the platen may serve as the wave guide or "horn" for the ultrasound vibrational application with, the wave energy being transmitted through the mold surface to the feed material or casting medium. The vibrational dwell rate/range may range from one-hundredth to five or more seconds. The amplitude range of the frequency is dependent upon mold thickness and area dimensions, as well as, specific requirements of the charge to be cast.

For this particular application (high purity alumina), ultrasound is the preferred vibrational medium as it affords a much higher frequency range than can be practically afforded with mechanical stimulation alone. However, other frequency sources may be used.

A preferred embodiment of the invention employs these EDM electrode- or conventional-machining produced plates as "master" components from which a plurality of "production" mold surfaces may be cast after a variety of methods known to those skilled in the art. Production mold surface material choices include but are not limited to zirconium silicate, tungsten carbide, steatite, silicon carbide, zirconium oxide (MgO stabilized), high-purity zirconium oxide (yttria stabilized), zirconium oxide (rare earth stabilized), stainless steel, mullite, alumina, silicon nitride, LAS, SiAlON, as well as polymer surfaces such as polyurethane. Additionally, other ceramic, glass, glass-ceramic, polymeric, cement and cementitious, metallic, and composite mold surfaces may be fabricated using this nesting/casting concept.

Given below are the densities and acoustic impedance properties of candidate mold materials for making of the aggregate as well as those used in processing of the mix prior to shaping the aggregate. Here, density values are in $kg/m^3$ and the acoustic impedance are in $\times 10^6 \, kg/m^2/s$.

| Material Ceramics | Density | Acoustic Impedance |
| --- | --- | --- |
| Alpha Silicon Carbide | 3.100 | 36.58 |
| Aluminum Nitride | 3.290 | 34.55 |
| Aluminum Oxide | 3.660 | 36.23 |
| Glass, Pyrex | 2.3209 | 13.02 |
| Magnesia | 13.842 | 34.00 |
| Marble | 2.650 | 16.30 |
| Porcelain | 2.400 | 13.44 |
| Fused Quartz | 2.200 | 13.13 |
| Fused Silica | 2.200 | 13.11 |
| Silicon Nitride | 3.200 | 34.56 |
| Titanium Carbide | 5.150 | 42.59 |
| Titanium Diboride | 4.620 | 58.21 |
| Tungsten Carbide | 15.000 | 99.00 |
| Metals | | |
| Aluminum | 2.700 | 17.06 |
| Berylium | 1.820 | 2.35 |
| Brass | 8.560 | 36.64 |
| Copper | 8.930 | 41.61 |
| Titanium | 4.500 | 27.32 |
| Zirconium | 2.480 | 30.13 |
| Composites | | |
| Phenolic Carbon | 1.510 | 6.01 |
| Phenolic Glass | 2.150 | 8.81 |
| Liquids | | |
| Acetone | 0.792 | 0.94 |
| Ethylene Glycol | 1.115 | 1.81 |
| Water | 1.000 | 1.48 |
| Paraffin Oil | 0.835 | 1.19 |

The mold surface may have a variety of designs. As an illustration, the core design "unit" in each half of a Tetrajack mold is a six-fold array of identical cavities. From the illustrations such as FIG. 14, a repetitive and interactive nature of this configuration may be seen.

It must be remembered, as is evident in the drawings, that the geometry of the cavities is unique to each half of the mold. Though it is believed that the cavities could be alternated "top-to-bottom" so as to provide mold halves that were identical to each other rather than distinct, the topography of such a configuration could be very complicated. As well, it has been determined that a certain advantage is gained by retaining "top half" and "bottom half" properties in some situations. For example, when the bottom half of the mold contains the Tetrajack cavity with a singular tetrahedral appendage at its center, then, when the top half of the mold is removed after press forming, the sheet of aggregate may remain in the bottom half because of the marginal increase in friction represented by depth and drafting of the singular tetrahedral appendage.

In the case of both mold halves, the cavities are radially displayed about a small hexagonal center (the "boss"). The cavities are separated by narrow, triangularly shaped planes. The short bases of the narrow triangle-shaped planes are each coincident with a side of the hexagonal boss. The line described by the long edge of the narrow triangular plane is coincident to the beginning of the cavity and is called a part line.

When the mold is fully closed, the tolerance on these narrow triangular planes is approximately 400 to 800 microns ($\mu m$). Of course, other tolerances may be used. This tolerance figure is believed appropriate to the press forming of Tetrajack aggregate of approximately 0.06 cm (as measured by the longest dimension).

When aggregates are press-formed in the mold, the above mentioned tolerance estimate may result in a 400 to 800 $\mu m$ webbing ("flash") that could serve to separate and stabilize the aggregate. While keeping the aggregate separate from each other, it is expected that the regular but highly varied topography of this flashing lends a desirable flexibility to the sheet of cast aggregate.

Because the flash attaches to the aggregate at the part line, it is believed critical that a thickness dimension of the flash be kept as low as possible. The reason for this is that after the aggregate (aluminum oxide in the illustrated case) have been sintered, they are released from the as-cast sheet form. In some cases it may be appropriate to release the as-cast aggregate from the sheet prior to sintering. A tumbling procedure may be used to separate or break up the aggregates. It has been demonstrated that the flashing may separate from the aggregate at the part line leaving a somewhat rough or jagged edge which, if left unattended, may result in packing hindrance.

Thus, the tumbling procedure (to be conducted for instance in an abrasive slurry) may also be utilized to smooth the part line. Clearly, the thicker the web/flashing is, the rougher and more jagged the part line of the freshly separated aggregate will be and, consequently, the more difficult will be the smoothing of the part line. Thus, the thickness dimension of the web/flashing must be kept as low as possible to facilitate the smoothing of the part line. This is deemed to be the case whether the aggregates are separated from the sheet and deburred prior to sintering or separated and deburred after sintering. Green strength and other limitations will help guide this particular decision.

The bottom mold half of the mold presents the boss as a projection, while the top half of the mold presents the boss as a cavity. When the mold is fully closed and prepared for increased pressure and vibration, the tolerance at the boss sites is preferably about 200 to 400 μm. Other tolerances may also be used. Some of the advantages of using the preferred tolerance include: (1) zero tolerance at the boss site would render full closure of the mold virtually impossible because some of the casting medium would be trapped between the top and bottom half boss sites; (2) it has been demonstrated that casting pressures may marginally deflect the mold. This is deemed desirable in some cases because this marginal deflection may increase pressure on the casting, rendering it susceptible to viscosity-reducing vibration. Temporary reduction in viscosity of the casting medium through increased pressure and vibration during press forming has resulted in uniform filling of the mold; (3) zero tolerance at the boss sites in the rotary production mode (discussed below) would lead to immediate mold wear if not irreparable damage.

The specimen is preferably, but not necessarily, a ceramic material. However, other moldable or castable materials may be used, such as metal, glass, clays, organic resins and fibers and polymer based materials.

Large aggregates (on the order of 1 to 10 cm. or greater, for example) may be made in simple, hand-operated gang molds. Then, after having been air dried, and/or calcined, and/or fully densified in a variety of fashions known to those skilled in the art, these large aggregate can be dispersed in a variety of conventional clay, cementitious, or composite matrices and employed as media for housing and/or other large structure fabrication. These aggregates can also be made by employing traditional cold isostatic pressing of individual rubber molds containing pre-determined amounts of casting media.

In the case of native clay or "adobe" style construction, simple and relatively lightweight molds or framework may be used to support this fabrication, then removed after the structure has cured. Indeed, a structure fabricated in the above fashion may be temporarily insulated on the outside with a refractory blanket and furnaced from within. It is believed that a structure resulting from this conceptual approach would exhibit advanced resistance to catastrophic failure from seismic activity.

Indeed, it is envisioned that many such very large objects may be fabricated after variations on this concept are developed.

It is believed that the room temperature viscosity and gel strength of the casting medium is of considerable importance when designing variable parameters for this work. As a comparison, the working characteristics of very stiff modeling clay approximate what is believed to be close to an ideal condition for a vibrationally-responsive medium. Relatively low casting pressure, when combined with vibrational constituents, render the casting medium from room-temperature pre-casting stability to a highly active, quasi-plasmic mode at the moment of formation (MOF).

It is believed that the vibrational constituent "ultrasound" is sufficient to erase density gradients common in conventional press forming. It is believed as well that the vibrational constituent "mechanical" may also be used to approximate this effect.

FIGS. 15–18 illustrate preferred embodiments of continuous 3-D molding apparatuses. A molding apparatus 200 (FIG. 15) comprising first and second mold members 202, 204, such as rotary drums each having a mold face 206, 208, respectively, defined on a peripheral mold surface 210, 212 thereof. Drive means 213, 215 are provided to rotate the first mold member 202 relative to the second mold member 204. The mold members 202, 204 are positioned so that their peripheral surfaces are adjacent one another to define a pinch zone 214 therebetween. The peripheral portions may be removable so that the mold surface may conveniently be changed.

Figure 17:
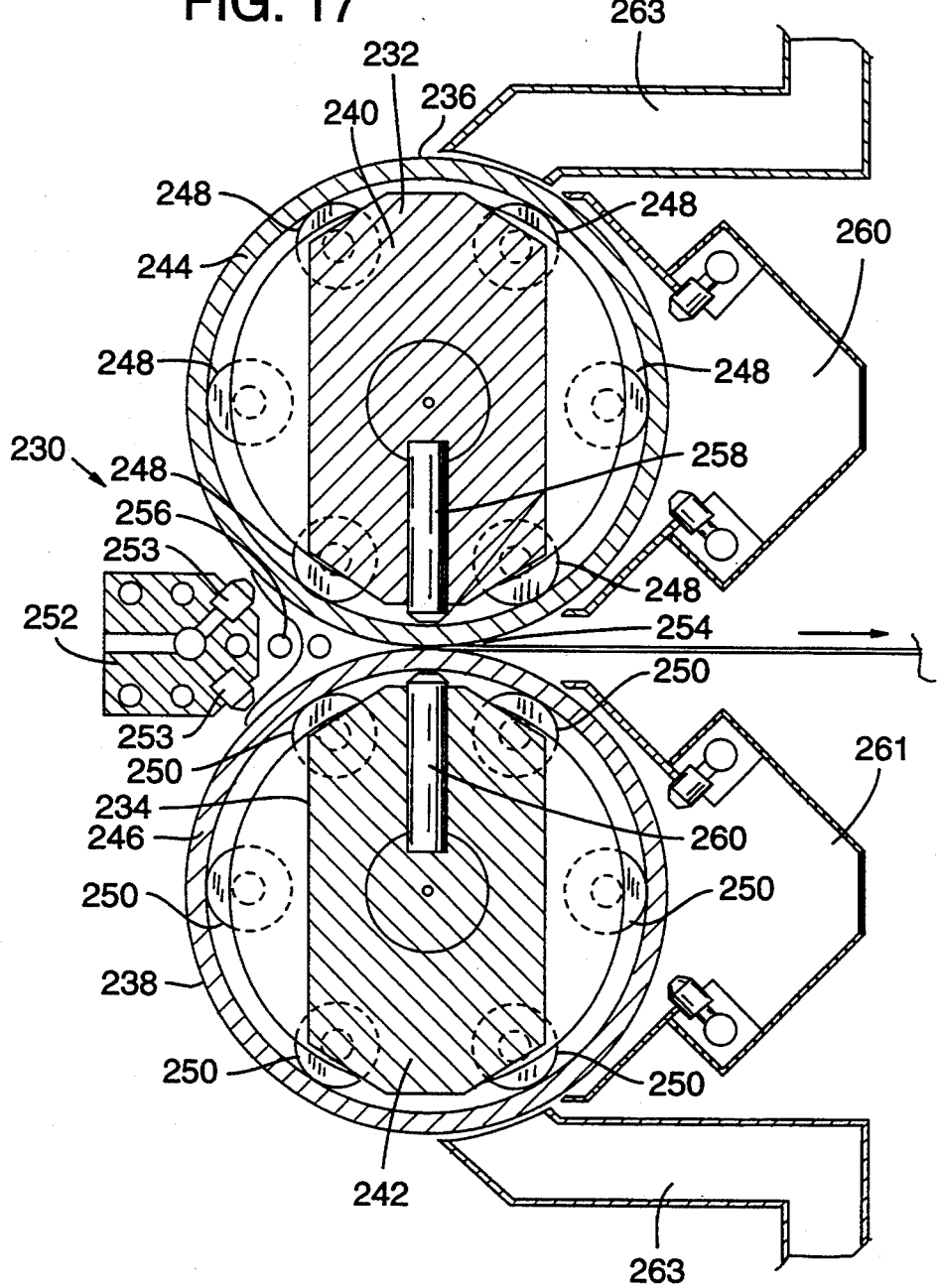
FIG. 17 shows a side view of an alternative embodiment of an apparatus of the present invention.
Figure 18:
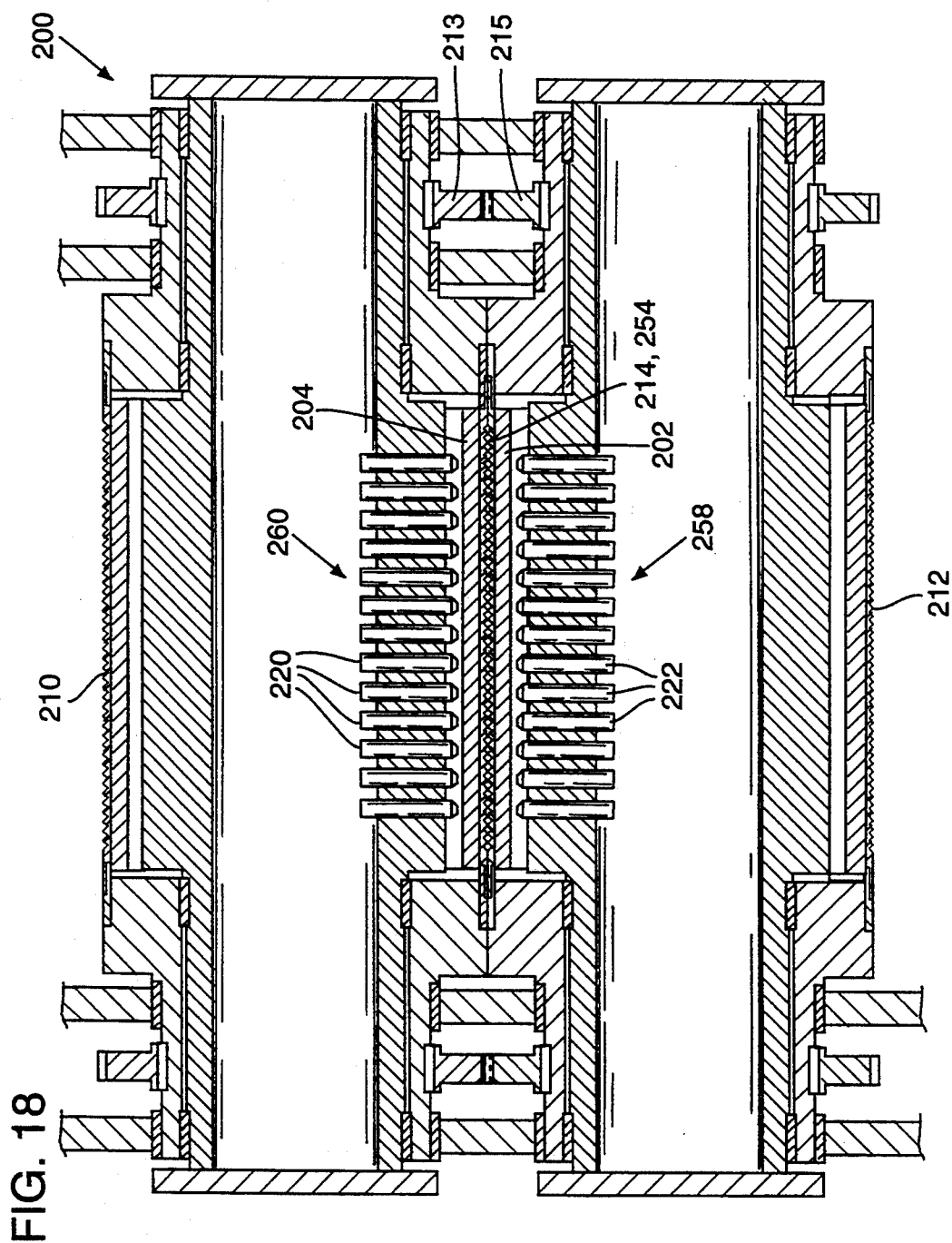
FIG. 18 show a top view of the apparatus of FIG. 17.

A feed material may be fed or inserted into the pinch zone 214. The feed material may be provided in a sheet form 219 (FIG. 15), or in a liquid or semi-rigid viscosity via spray feed or liquid transfer mechanisms (FIGS. 17, 18). The sheet 219 may be continuously fed between the mold members 202, 204. When the feed material has passed through the pinch zone 214, a fabric 221 is formed including a web of aggregates. For example, the aggregates may include the Tetrajack, Tetratwin or Starjack. Means for providing vibrational energy to the feed material may be applied while the material is being molded between the mold surfaces 210, 212. In the preferred embodiment the vibration means include transducers 220, 222.

Press forming of aggregate in the rotary mode begins with introduction of feed material into the thickness control zone immediately proceeding the pinch zone of the opposing and counter-rotating rollers (160). The feed material may be introduced in a variety of ways: tape (cast or extruded), slurry, or spray means. It is believed that spray means affords the best mode opportunity for this particular application. A pressure- and viscosity-controlled spray device deposits a thickness of feed on either or both of the counter-rotating rollers in an area just prior to the "pinch zone" of the two rollers. The sprayed deposit then passes by a thickness monitor which feeds data back to both the output control system on the spray device and the rotational speed controls of the mold support rollers, thereby insuring appropriate feed thickness at the pinch zone (164).

As the feed material enters the pinch zone, it encounters broadfield and continuously applied vibrational energy (166) (in the present case, ultrasonic). This application of vibrational energy is transmitted through the mold surface by an array of ultrasonic transducers oriented parallel to the long axis of either or both rollers (in the present case, both). The transducer array is preferably mounted inside the roller so as to present the transducers in close proximity to the rotating mold member.

The array of transducers preferably consists of three parallel rows of transducers. The first row of transducers is focused on that part of the pinch zone immediately preceding the area where opposing mold cavities are at their closest proximity. The first row of transducers emits a continuous low energy frequency and amplitude designed to marginally reduce the viscosity of the incoming feed material as it approaches the Moment of Formation (MOF) where opposing mold cavities are at their closest proximity.

The feed material then passes into the MOF as the mold cavities, upon which the feed material has been deposited, come to full closure (168). At this point, transducers in row "b" transmit a burst, or quanta, of high energy ultrasonic vibration coinciding exactly with the fraction of time that the mold cavity is closed.

This high energy application of ultrasound is expected to facilitate complete homogenization and displacement of the feed material into the closed cavity.

As the mold cavity begins to open, the feed material, now press formed into a fabric or sheet of nested parts (in the present case, aggregate) encounters the continuously applied transmission of vibrational energy (in the present case, ultrasound) from row "c" of the transducer array (170). The function of vibrational energy from row "c" is much the same as row "a," except that row "c" energy is designed to facilitate the output transition of feed materials subjected to row "b" high energy. It is believed that energy from row "c" will prevent undue shocking of the press formed parts (in the present case, aggregate) as they are released from the high energy conditions of the MOF. In some cases it may be preferable to exclude energy from row "c" transducer components.

The sheet or fabric of nested parts is then complete and ready for separation into controlled lengths for batch debindering, deburring and/or furnacing or kept intact and transferred continuously into a furnacing environment for densification.

An alternative embodiment is shown in FIGS. 17 and 18. A molding apparatus 230 includes first and second mold members 232,234 each having a mold surface 236, 238. The mold members are rotatable in opposite directions. Each mold member includes a stationary inner portion 240, 242, respectively, and rotatable peripheral portions 244, 246. The mold surfaces are preferably formed in the peripheral portions. The peripheral portions may be rotated by drive means such as drive rolls 248, 250 rotatably attached to the stationary portions.

An ejector 252 having orifices 253 formed therein may be positioned between the mold members for ejecting the feed material to at least one of the molding members. The ejected feed material may be conveyed by the rotatable molding members to a pinch zone 254 formed therebetween. A sensor 256, such as a photo sensor, may be placed between the ejector 252 and the pinch zone 254 for measuring and controlling the amount of feed material that is deposited onto the mold members.

Means for providing vibrational energy to the feed material while the material is being molded between the mold surfaces 236, 238 may be provided. For example, the vibrational energy may be provided by transducer assemblies 258, 260. In the preferred embodiment, the transducer assemblies supply ultrasound. The apparatus may include washing manifolds 261 and mold dryers 263 for removing excess feed material from the mold surfaces and for drying the mold surfaces.

Figure 19:
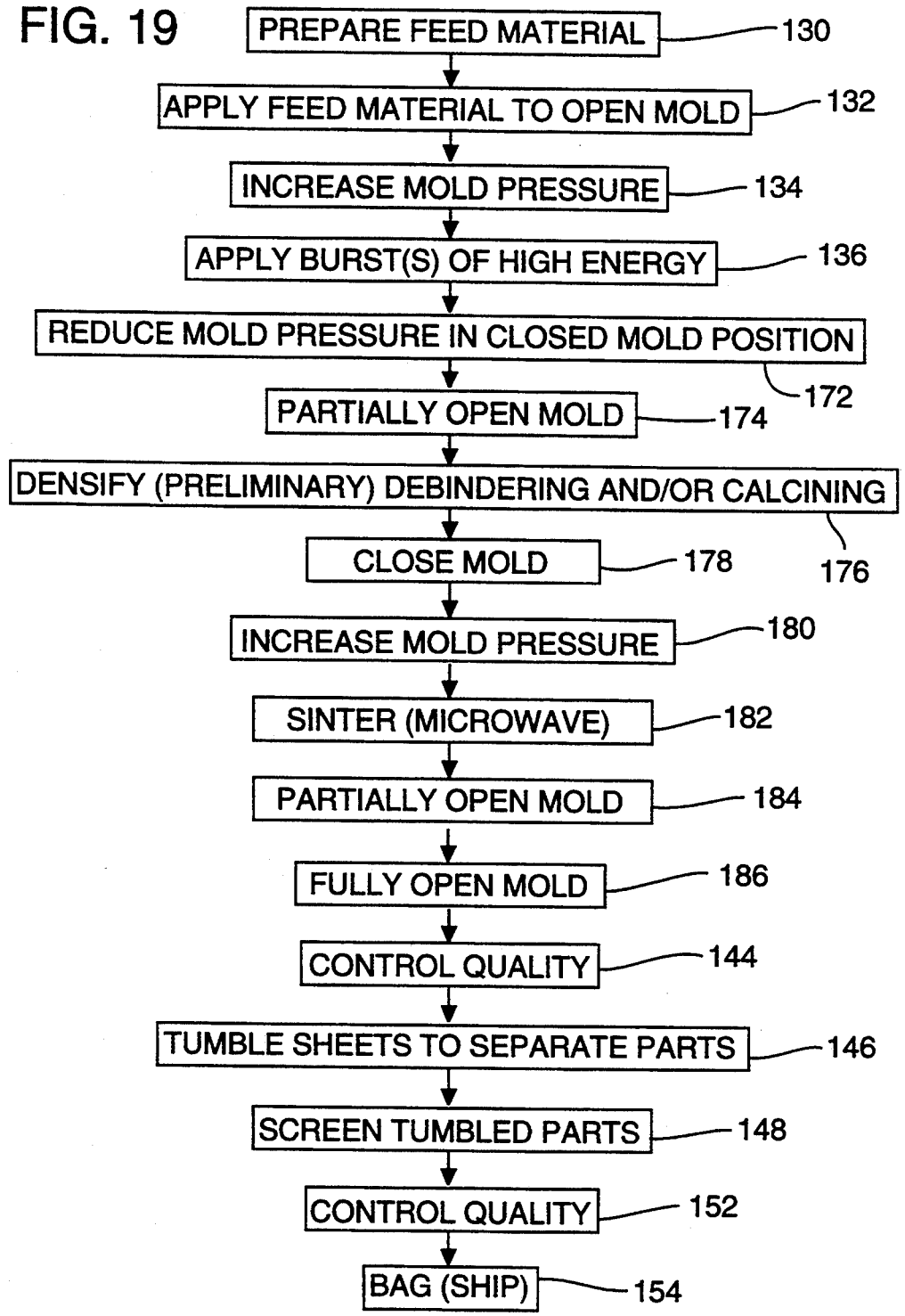
FIG. 19 shows a flow chart illustrating one manner of making the aggregates.

Flow chart FIG. 19 details the continuous process of aggregate production and sintering. A press formed sheet of feed material, preferably formed after the fashion disclosed in FIG. 7 (130, 132, 134, 136), is placed on the lower of two opposing mold halves. Press forming of the parts (in the present case, aggregate) is conducted after the fashion disclosed in FIG. 7, up to but not including the removal phase disclosed in FIG. 7. Mold pressure is relieved while still in the closed mold position (172).

At this point, the mold is partially opened (174) (approximately 10% of the thickness dimension of the formed part). Heat energy is applied to the press forming to accomplish debindering and/or preliminary densification (calcining).

The mold is then closed (178). Mechanical pressure on the mold is raised (180) and microwave energy is applied through either or both mold surfaces until partial or full densification of the fabric of parts has been achieved (182).

The mold is then allowed some time to "cool off" before being partially opened (184) and allowed to return to room temperature. The mold is then fully opened and the sintered or partially densified sheet of parts is removed and inspected for flaws (144).

Post-densification processing would follow the methods disclosed in FIG. 7 (146, 148, 152, 154).

Though full densification of alumina has been achieved with microwaves, in some cases it may be preferable to only partially densify the fabric. In all cases, application dependence will control the degree of densification as well as virtually every other parameter of this novel process.

Figure 20:
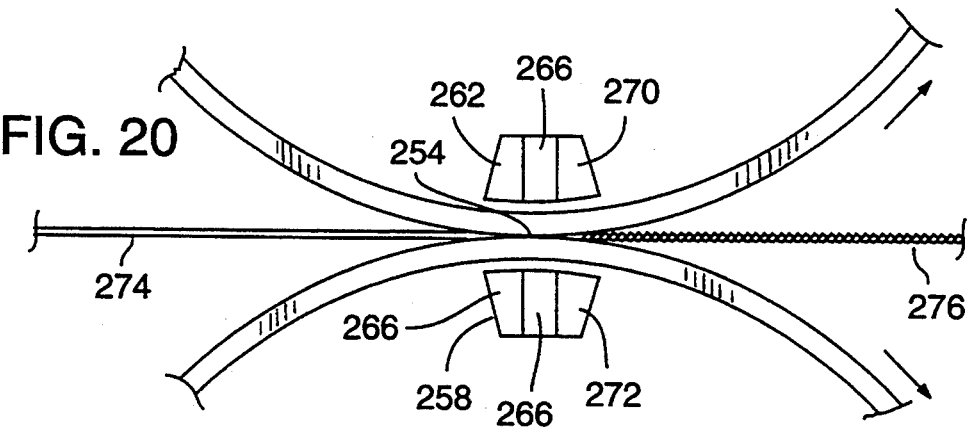
FIG. 20 shows an enlarged view of the apparatus of FIG. 17.

As best illustrated in FIG. 20, each transducer assembly 258, 260 may include a first transducer 262, 264 for applying a first frequency to the material prior to the pinch zone 254; a second transducer 266, 268 for applying a second frequency to the material while the material is in the pinch zone; and a third transducer 270, 272 for applying a third frequency to the material after the material has passed through the pinch zone. In the preferred embodiment, the transducers 266, 268 may provide a very high amplitude of ultrasound. In this way, a feed material 274 may be subjected to vibration provided by the transducers as the material passes through the pinch zone 254 to produce a fabric including a web of aggregates. As described in detail below, the vibrational energy reduces the viscosity of the feed material to enhance the even distribution of the feed material into the mold cavities.

Figure 15:
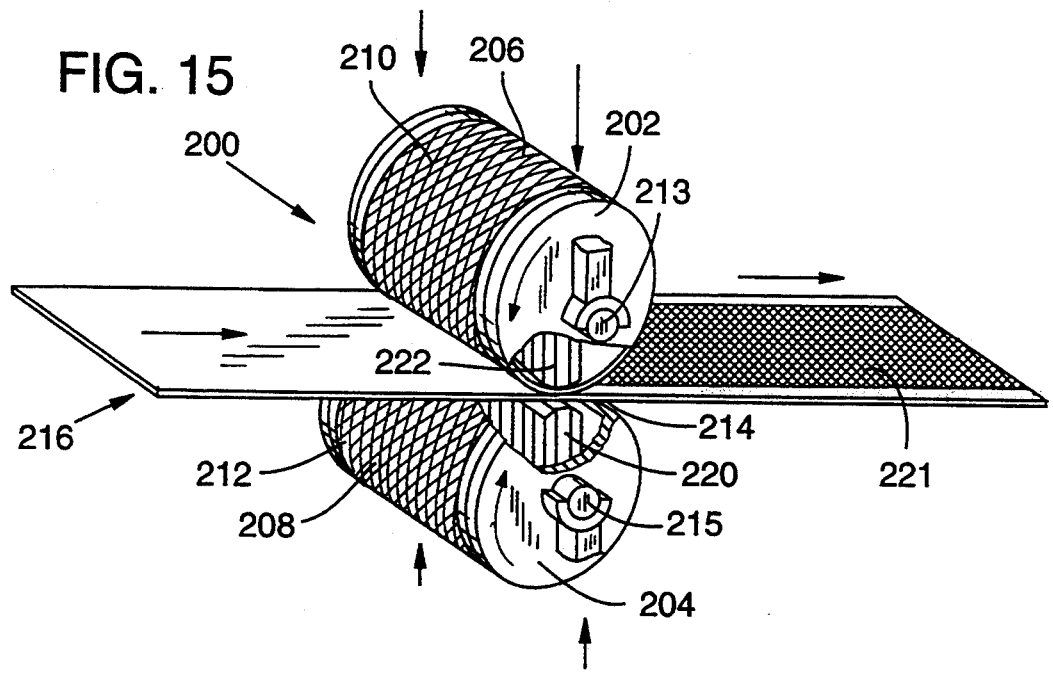
FIG. 15 shows a perspective view of an apparatus of the present invention.
Figure 16:
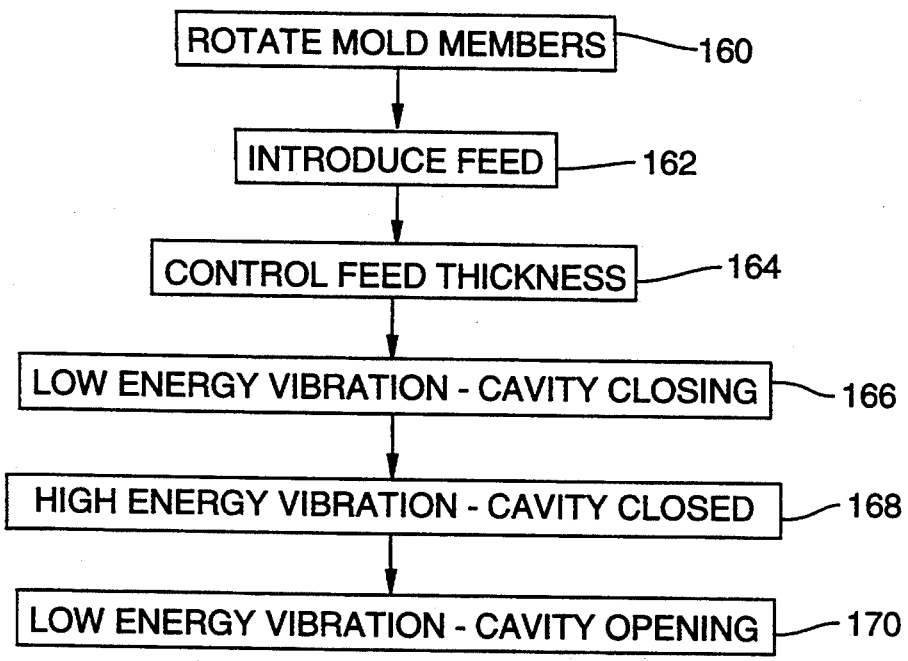
FIG. 16 shows a flow chart illustrating one manner of making the aggregates of the present invention.
Figure 21:
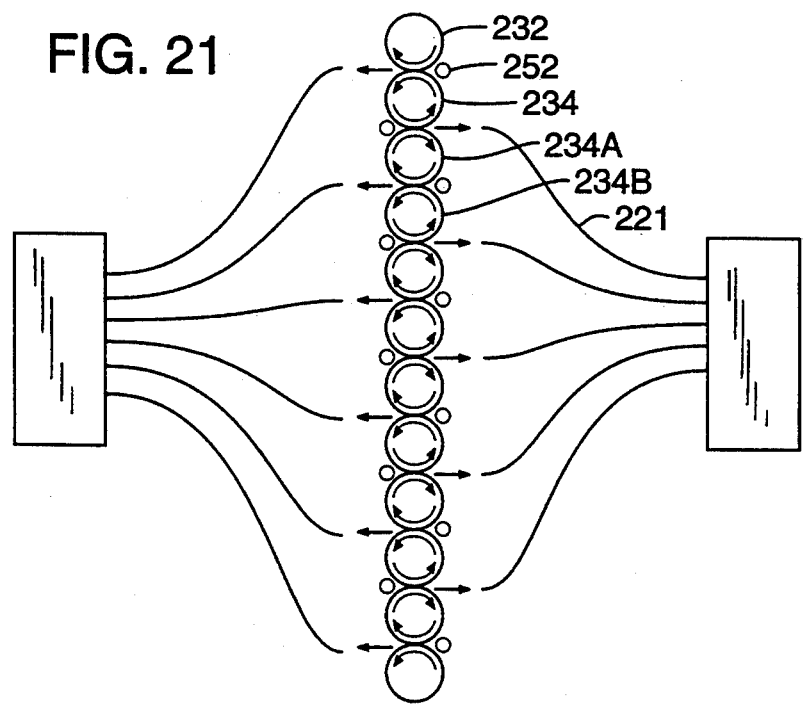
FIG. 21 shows an alternative embodiment of an apparatus of the present invention.

The mold members may be stacked as shown in FIG. 21 so that instead of two mold surfaces 232, 234, producing only one sheet as shown in FIG. 15, three mold surfaces 232, 234, 234a may be utilized to produce two sheets; four mold surfaces 232, 234, 234a, 234b to produce three sheets; and so on.

Figure 22:
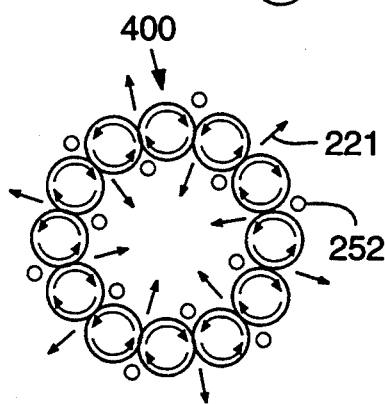
FIG. 22 shows an alternative embodiment of an apparatus of the present invention.

The mold members may also be oriented in a circular array so that twelve mold members 400 produce twelve sheets (FIG. 22).

In another aspect of the invention, a packed composite 300 (in the present case, a refractory concrete "brick") is formed. Its constituents are a sintered reinforcement phase of three-dimensionally reticulate aggregate (in the present case, a Tetrajack), and a cementitious matrix phase (in the present case, calcium aluminate).

Aggregate according to FIG. 7 are employed as the reinforcement phase in conjunction with state of the art calcium aluminate cement, such as is available from any of several refractory concrete producers, such as Lehigh Portland Cement Co., Lafarge Calcium Aluminates, Inc., or Alcoa Industrial Chemical Co.

Figure 24:
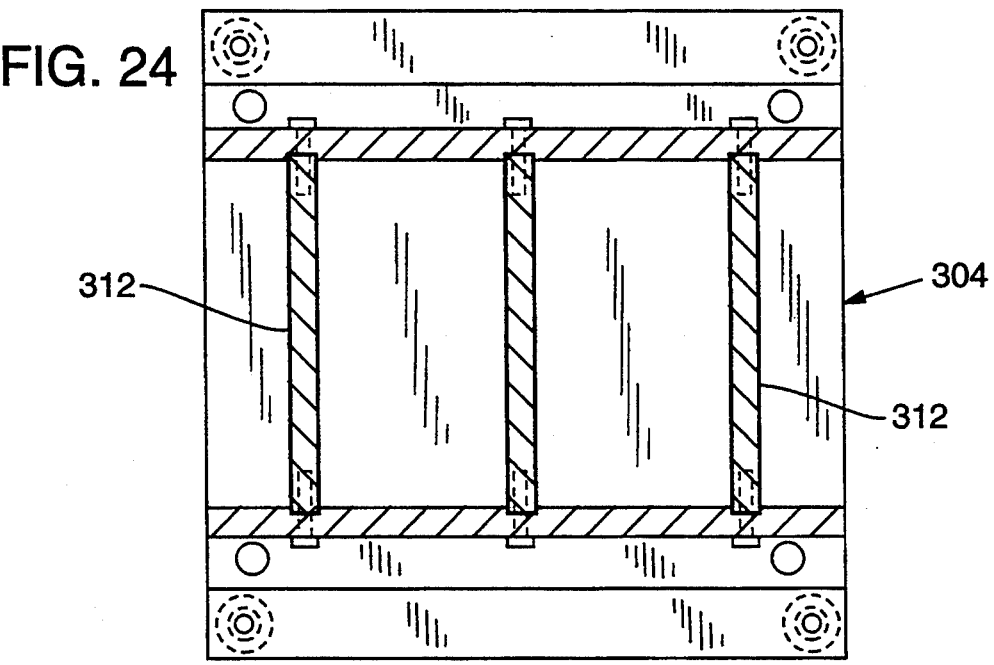
FIG. 24 shows a top view of the apparatus of FIG. 23 along line 24—24.
Figure 23:
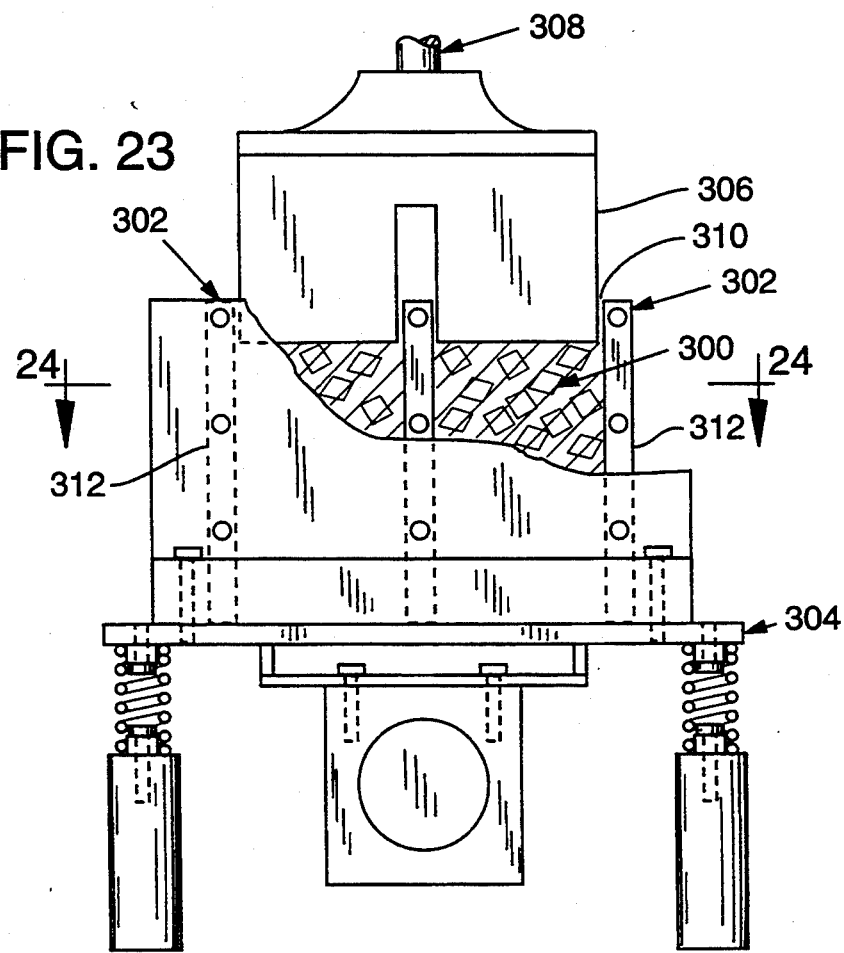
FIG. 23 shows a view of an alternative embodiment of an apparatus of the present invention.

Referring to FIGS. 23 and 24, the device and procedures for the casting of this composite are as follows:

1. A charge is introduced into a brick mold or gang of molds 302. The charge may be pumped, troweled, sprayed, poured, or otherwise deposited into the open cavity.

2. It is believed that the charge, consisting of a reinforcement phase dispersed in a matrix phase, should have the "ball in hand" consistency known to those skilled in the clay art.

3. The mold sits upon a vibration table 304 in the same fashion as the aggregate production mold of FIG. 9.

4. After charging the mold, vibration commences. Vibration serves to de-air the charge and begin reticulation of the aggregate.

5. After the charge has been de-aired, the mold platen 306 is lowered and pressure is exerted on the charge while the vibrational frequency is increased and/or varied in application dependent patterns 6. After some time, vibrational frequency is reduced; then after some more time, it is stopped altogether.

7. Ram pressure 308 on the platen 306 is relieved, and the casting is allowed to harden.

Where volume fractions of reinforcement that exceed 85 to 90 percent are concerned, it may be necessary to draw off or eliminate some of the matrix phase. This may be accomplished throughout the reticulation phase by allowing some of the matrix phase to bypass through the gap 310 between the platen 306 and the sidewalls 312 of the mold.

As well, matrix material may be drawn out the cavity in controlled amounts through ports located on any and or all of the surfaces of the mold.

A rotary casting device for the manufacture of small parts such as three-dimensionally reticulate aggregate for advanced ceramic applications is considered. The device, consisting of two or more counter rotating rollers indexed to c.400 $\mu$m may be capable of continuous and high-speed production of nested 2–3 dimensional parts in a variety of media.

In vertical feed and delivery operations, a two-roller system is envisioned horizontal feed and delivery applications may utilize 3 rollers to produce 2 pressed part sheets; 4 rollers to produce 3 sheets, 5 to produce 4 and so on.

The mold surfaces of the rollers are entirely dependent upon application demands. Specific application and forming requirements may utilize chemical vapor deposited, (CVD), mold surfaces such as silicon carbide. It is believed that vibrational applications at the MOF in this rotary pressing concept may yield truly homogenous green bodies.

The vibration sources may be adapted to provide multi-phase vibrational energy to the feed material fed into the pinch zone. The vibration source may be a mechanical, ultrasonic, electromagnetic, microwave or any other equivalent vibration source known to those skilled in the art. As is explained in detail below, the vibration source is adapted to supply vibrational energy to the molding medium at the moment of formation (MOF), that is the dwell point in the mold when pressing pressure is at its peak. The vibration source may supply broadfield and/or coherent waveforms. For example, the vibration source may include a plurality of ultrasonic transducers mounted inside the rollers. As well, single, line-oriented transducers may be employed in this capacity. The transducers may also be mounted inside either one or both molding halves of a conventional book mold such as described in FIG. 9.

Prior work has approximated homogenization of the mix using high intensity ultrasonics in feed material preparation only. One example of this art is cited in Sonicator Series, Application Notes from Heat Systems Ultrasonics, Inc., 1938 New Highway, Farmingdale N.Y. However, during mold filling, flow patterns are unavoidable due to particle segregation and the pouring action itself. This leads to subtle density gradients at the forming stage. Subsequently, during sintering, zones or regions within the body are separated by contour-like boundaries. On opposing sides of these contours, non-symmetrical and varying shrinkage typically occurs. Residual stresses therefore result. When the threshold fracture stress is exceeded, cracks are formed within the body.

Therefore, it is preferable to apply additional energy to the body during the MOF. This additional energy may erase the flow lines and density gradients by redistributing and homogenizing the ingredients that compose the green body.

In addition, a significant advantage gained by the use of vibrational applications, such as ultrasound, at the MOF would be the resultant reduction in viscosity of the charge, thereby allowing lower forming pressures to attain higher densities in the green body.

A novelty of this application of vibrational energy at the MOF is believed to lie in the fact that it does something special during the moment of green body formation to minimize and perhaps eliminate green body defects.

The prior art has focused on the powder preparation techniques and feed mixes as being critical to obtaining highest green density. Vibrational energy, on the other hand, utilizes the prior art to its maximum and extends the technology to the MOF in ways heretofore unknown. The uniqueness of the novel vibrational aspects of our process is that, among other expected benefits, it offers for the first time techniques that would eliminate flow lines and density gradients during the formation of the green body.

The timing of this vibrational aspect in relation to the object being formed is believed to be critical. In the case of the rotary press forming apparatus, it is believed that vibration (ultrasound in the present case, for alumina aggregate), would be broadly and continuously applied through the mold surface, at an area directly preceding (less than five times the aggregate thickness dimension), the MOF and beyond to a line about five times the aggregate thickness dimension. In addition, the area immediately bounded by the MOF, where full mold closure, maximum forming pressure, and minimum viscosity of the feed material are to be expected, an additional and discreetly timed quanta of ultrasonic energy could be applied.

Viscosity of the feed material is often a temperature- and time-dependent phenomenon. The applied stress is known to behave inverse to the temperature effect in the flow behavior of solids, liquids, and media containing both solids and liquid. Therefore, the application of vibration, which is in fact a form of stress imposed both continuously and in some precise fashion for a short duration, is thought to increase the localized temperature thereby reducing the viscosity.

The applied energies may be of two forms including: increased pressure during mold closure at the MOF and ultrasonic energy being applied broadly and continuously to the area immediately preceding the MOF, the MOF area itself, and the area immediately following the MOF. The sources (in the present case) are: accumulating pressure resulting from the tolerance conditions of the rotary pressing process; ultrasonic transducers arrayed so as to affect the zone immediately preceding and following the MOF; and pulse-oriented ultrasonic transducers arrayed directly perpendicular to the closed cavity conditions at the MOF. This last, pulse oriented source of energy may be timed to begin just prior to full closure of the cavity and extend through the period of closure to end just as the cavity is beginning to open. Exact timing depends entirely upon application requirements, thickness dimension and impedance factors of the mold material, frequency and amplitude of the controlled burst, and rotational speed of the rotary forging/pressing operation as it pertains to the specific feed material and application.

Plane unfocused, line, or point and cylindrical focused transducers known to those skilled in the art may be used. A coupling medium may be positioned between the transducer and the mold. The medium may be a liquid or solid. In the preferred embodiment, the coupling medium is a solid material that is relatively transparent to high frequencies ranging from 1 KHz to over 100 MHz. For certain applications, transducer mountings and boss sites may coincide. For other applications it may be advantageous to locate transducers directly over and/or under the central axis of the cavities. Still other applications may require broadfield vibrational energy.

In many applications, it is thought desirable that the aggregates or parts be sintered or densified to a temperature higher than that to which the formed matrix will be furnaced or cured, so that the second firing may have no appreciable effect on the aggregate material. In other applications, thermal expansion considerations indicate that the aggregates be only partially fired before use. The furnacing of the formed matrix at a higher temperature then effects a further change in the aggregate. This latter technique can be used to control shrinkage of the aggregate vis-a-vis the matrix.

The molded matrix may be fired in a furnace. It will be recognized that large scale sintered ceramic structures can be made by similar processes. Aggregates, which may be composed of pre-fired alumina, can be dispersed in a matrix of powdered alumina, molded and fired.

As mentioned earlier, to break up or separate the aggregates, the sintered sheet may be fed between rollers having a nip zone formed therebetween. The rollers are designed to impart bending pressures onto the sintered sheet break up the sheet into a plurality of aggregates. The rollers may be made of metal, hard rubber or urethane. To remove sharp edges and flash, the aggregates may be tumbled in a tumbler to create a finished aggregate. It is apparent that the aggregates may be tumbled directly without first separating the aggregates from the fabric in rollers. As well, it is apparent that deburring may be accomplished prior to sintering.

Having described the principles of our invention with reference to several preferred embodiments, it will be apparent that the invention can be modified in arrangement and detail without departing from such principles. For example, while the invention has been illustrated with reference to the use of reticulate aggregates in refractory materials, it will be recognized that such aggregates can be advantageously used in a variety of other matrices, including rubber, resin, cement, etc. Similarly, while the invention has been illustrated with reference to selected reticulate aggregate forms, it will be recognized that a variety of other such aggregate forms can readily be devised. Still further, while the preferred fabrication processes have been disclosed as utilizing vibrational energy, other such processes can be implemented without the application of such energy.

It will also be recognized that very large structures may be assembled from discrete clay, ceramic, or other components joined by cast rubber, resin or cement media employing the inter-structurally superior mechanics of the reticulated aggregate of the present invention.

In view of the many possible embodiments to which the principles of our invention may be put, it should be recognized that the detailed embodiments are illustrative only and should not be taken as limiting the scope of our invention. Rather, we claim as our invention all such embodiments as may come within the scope and spirit of the following claims and equivalents thereto.

Further, considering the interdependence of the shapes claimed herein with their fabrication and processing methodologies it is suggested that the claims to follow merit serious consideration as aspects to a single work of art.

By the foregoing specification, we have detailed concepts we believe have merit, and have detailed the manners by which we believe they can best be put to practice. They have not all, however, yet borne the scrutiny of academic experimentation and industry practice.

While all inventors look to the future, none of us sees clearly. We hope that, when viewed in the light of hindsight, the reader will indulge our excesses and pardon our mistakes, and nonetheless find merit in our present vision.

While the present invention has been described in accordance with preferred embodiments, it is to be understood that various substitutions and alterations may be made thereto without departing from the spirit and scope of the appended claims.

I claim:

1. A fabricated aggregate for use with other such aggregate in a structural matrix, the fabricated aggregate being characterized by more than six faces of identical size and shape, and by members extending outwardly in three dimensions, said aggregate being rigid, the aggregate including a plurality of faces, at least a pair of which intersect to bound a concave region, the aggregate including a plurality of such concave regions, wherein said concave regions serve to arrest propagation of matrix cracking when the aggregate is disposed in a structural matrix.

2. The fabricated aggregate of claim 1 wherein edges of each of said more than six identically sized and shaped faces are coplanar.

3. The fabricated aggregate of claim 1 in which each of said more than six faces of identical size and shape is planar.

4. The fabricated aggregate of claim 1, including exactly twelve faces of identical size and shape.

5. The fabricated aggregate of claim 1 including exactly twenty-four faces of identical size and shape.

6. The fabricated aggregate of claim 1 in which the aggregate comprises a ceramic material.

7. The fabricated aggregate of claim 1 having a maximum dimension of less than one inch.

8. The fabricated aggregate of claim 1 having a maximum dimension of more than one inch.

9. A product that includes a plurality of fabricated aggregates according to claim 1.

10. A material including a plurality of fabricated aggregate according to claim 1 disposed in a matrix material.

11. The material of claim 10 in which the matrix material is chosen from the group consisting of ceramic, rubber, resin, and cement.

12. The material of claim 10 in which the fabricated aggregates have a density greater than a density of the matrix.

13. The material of claim 10 wherein the matrix material is a refractory.

14. The material of claim 10 in which the fabricated aggregates, in at least localized regions, are positioned in a regular array.

15. The material of claim 14 in which the fabricated aggregates, in at least localized regions, are positioned in a regular three-dimensional array.

16. The material of claim 14 in which the fabricated aggregates, in at least localized regions, are nested in a reticulated array.

17. The material of claim 16 in which the fabricated aggregates, in at least localized regions, are nested in a reticulated three-dimensional array.

18. The fabricated aggregate of claim 1 in which the aggregate is shaped to prevent zero-matrix packing with other, like, aggregate.

19. A fabricated aggregate for use with other such aggregate in a structural matrix, the aggregate being characterized by more than six three-sided surfaces, wherein edges of each of said three-sided surfaces are coplanar, the aggregate including a plurality of faces, at least a pair of which intersect to bound a concave region, the aggregate including a plurality of such concave regions, wherein said concave regions serve to arrest propagation of matrix cracking when the aggregate is disposed in a structural matrix.

20. The fabricated aggregate of claim 19 in which each of the three-sided surfaces is planar.

21. The fabricated aggregate of claim 19 comprising a unitary body in the shape of a base tetrahedron having at least two tetrahedral appendages extending therefrom, each of said appendages having a face coincident with one of the faces of the base tetrahedron.

22. The fabricated aggregate of claim 19 including exactly twelve three-sided surfaces.

23. The fabricated aggregate of claim 19 comprising a unitary body in the shape of a base cube with a four-sided arm extending outwardly from each face of the cube.

24. The fabricated aggregate of claim 23 in which each arm has the shape of an obelisk, tapering as it extends away from the base cube.

25. The fabricated aggregate of claim 19 including exactly twenty-four three-sided surfaces.

26. The fabricated aggregate of claim 19 including a plurality of four-sided surfaces.

27. The fabricated aggregate of claim 26 including exactly twenty-four trapezoidal surfaces.

28. A product that includes a plurality of fabricated aggregates according to claim 19.

29. The fabricated aggregate of claim 19 in which the aggregate is shaped to prevent zero-matrix packing with other, like, aggregate.

30. A reinforced composite including a plurality of fabricated aggregate disposed in a structural matrix material, each of said plurality of aggregate being characterized by more than six faces of identical size and shape, and by members extending outwardly in three dimensions, each of said plurality of aggregate having a shape which prevents zero matrix packing, the plurality of aggregate being disposed within the structural matrix such that there exists a pair of aggregates between which an imaginary plane cannot be positioned without intersecting each of said aggregates at more than a single point, each of said plurality of aggregate including a plurality of faces, at least a pair of which intersect to bound a concave region, each aggregate including a plurality of such concave regions, the faces and associated concave regions of a plurality of said aggregate cooperating to arrest propagation of cracks in the matrix material.

31. The reinforced composite of claim 30 in which each of said plurality of aggregate has more than six three-sided surfaces.

32. The reinforced composite of claim 31 in which each of said plurality of aggregate has twelve three-sided surfaces.

33. The reinforced composite of claim 31 in which each of said plurality of aggregate has twenty-four three-sided surfaces.

* * * * *